(12) United States Patent
Kiyota

(10) Patent No.: US 11,530,065 B2
(45) Date of Patent: Dec. 20, 2022

(54) CONTROL APPARATUS, SYSTEM, AND PROGRAM LIBRARY

(71) Applicant: OMRON Corporation, Kyoto (JP)

(72) Inventor: Yusuke Kiyota, Minoh (JP)

(73) Assignee: OMRON Corporation, Kyoto (JP)

( * ) Notice: Subject to any disclaimer, the term of this patent is extended or adjusted under 35 U.S.C. 154(b) by 910 days.

(21) Appl. No.: 16/358,745

(22) Filed: Mar. 20, 2019

(65) Prior Publication Data

US 2019/0217984 A1 Jul. 18, 2019

Related U.S. Application Data

(62) Division of application No. 14/887,543, filed on Oct. 20, 2015, now Pat. No. 10,287,046.

(30) Foreign Application Priority Data

Oct. 28, 2014 (JP) ................................ 2014-219618
Mar. 24, 2015 (JP) ................................ 2015-060388

(51) Int. Cl.
*H02P 7/00* (2016.01)
*B65B 57/02* (2006.01)
(Continued)

(52) U.S. Cl.
CPC .............. *B65B 57/02* (2013.01); *B29C 65/18* (2013.01); *B29C 65/74* (2013.01); *B29C 66/1122* (2013.01); *B29C 66/4312* (2013.01); *B29C 66/7373* (2013.01); *B29C 66/8246* (2013.01); *B29C 66/83513* (2013.01); *B29C 66/849* (2013.01); *B29C 66/922* (2013.01); *B29C 66/9292* (2013.01); *B29C 66/932* (2013.01);
(Continued)

(58) Field of Classification Search
CPC .......... H02P 6/08; G05B 11/01; G05B 19/237
See application file for complete search history.

(56) References Cited

U.S. PATENT DOCUMENTS 6,555,985 B1 * 4/2003 Kawabata ................. H02P 8/38
318/434
8,723,461 B2 * 5/2014 Yoo ....................... H02P 25/024
318/434
(Continued)

*Primary Examiner* — Erick D Glass
(74) *Attorney, Agent, or Firm* — Metrolex IP Law Group, PLLC

(57) ABSTRACT

A method accurately detects biting of a foreign object in a packaging machine. A control apparatus controls a packaging machine that sequentially seals and/or cuts a packaging material transported in a first direction using a rotor. The rotor is arranged to have a tangent to its outer circumference portion in contact with the packaging material extending in the first direction. The rotor is drivable and rotatable by a driver. The control apparatus includes an information obtaining unit that obtains information indicating a rotational position of the rotor and a status value of the driver in predetermined cycles, and a determination unit that determines a presence of an abnormality in a sealed portion of the packaging material using, from the information obtained by the information obtaining unit, a status value of the driver corresponding to a rotational position of the rotor falling within a predetermined range or being a predetermined position.

2 Claims, 14 Drawing Sheets

(51) Int. Cl.
  *B65B 61/08*    (2006.01)
  *B29C 65/18*    (2006.01)
  *B29C 65/74*    (2006.01)
  *B29C 65/00*    (2006.01)
  *B65B 51/30*    (2006.01)
  *B65B 57/10*    (2006.01)
  *G05B 11/01*    (2006.01)
  *G05B 19/23*    (2006.01)
  *H02P 6/08*     (2016.01)
  *B65B 65/02*    (2006.01)
  *B65B 9/02*     (2006.01)

(52) U.S. Cl.
  CPC .......... *B29C 66/9392* (2013.01); *B29C 66/96* (2013.01); *B29C 66/9672* (2013.01); *B29C 66/9674* (2013.01); *B65B 51/306* (2013.01); *B65B 57/10* (2013.01); *B65B 61/08* (2013.01); *G05B 11/01* (2013.01); *G05B 19/237* (2013.01); *H02P 6/08* (2013.01); *B29C 66/7352* (2013.01); *B29C 66/939* (2013.01); *B65B 9/02* (2013.01); *B65B 65/02* (2013.01)

(56) References Cited

U.S. PATENT DOCUMENTS

| 2012/0115680 | A1* | 5/2012 | Hase | F16H 61/061 |
| | | | | 477/79 |
| 2012/0316675 | A1* | 12/2012 | Urano | H02N 2/14 |
| | | | | 318/116 |
| 2014/0035496 | A1* | 2/2014 | Mizuo | H02P 8/18 |
| | | | | 318/400.17 |
| 2014/0217951 | A1* | 8/2014 | Sugihara | G05B 19/19 |
| | | | | 318/600 |

* cited by examiner

| Time | Speed command 1 | Speed command 2 | Rotational position 1 | Rotational position 2 | Speed 1 | Speed 2 | Torque value 1 | Torque value 2 | Current value 1 | Current value 2 | ... |
|---|---|---|---|---|---|---|---|---|---|---|---|
| 1 | 10 | 10 | 0 | 0 | 10 | 10 | 20 | 20 | 50 | 50 | ... |
| 2 | 10 | 10 | 3 | 3 | 10 | 10 | 20 | 20 | 50 | 50 | ... |
| 3 | 8 | 6 | 6 | 6 | 10 | 10 | 20 | 20 | 50 | 50 | ... |
| 4 | 6 | 6 | 9 | 5 | 7 | 7 | 20 | 20 | 35 | 35 | ... |
| 5 | 6 | 6 | 11 | 11 | 6 | 6 | 19 | 19 | 35 | 35 | ... |
| 6 | 6 | 6 | 13 | 13 | 8 | 8 | 19 | 19 | 35 | 35 | ... |
| 7 | 6 | 6 | 15 | 15 | 8 | 8 | 19 | 19 | 35 | 35 | ... |
| ... | ... | ... | ... | ... | ... | ... | ... | ... | ... | ... | ... |

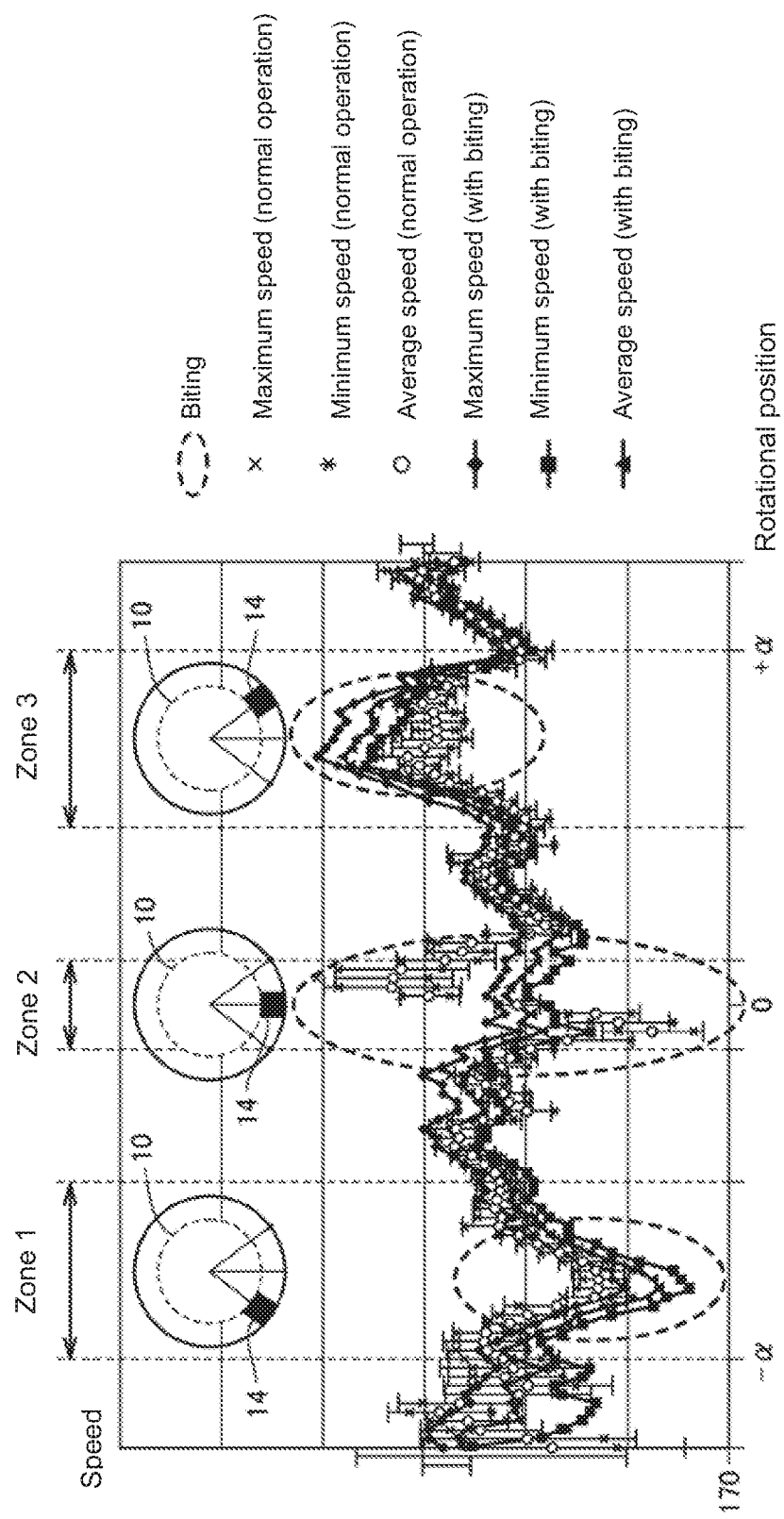

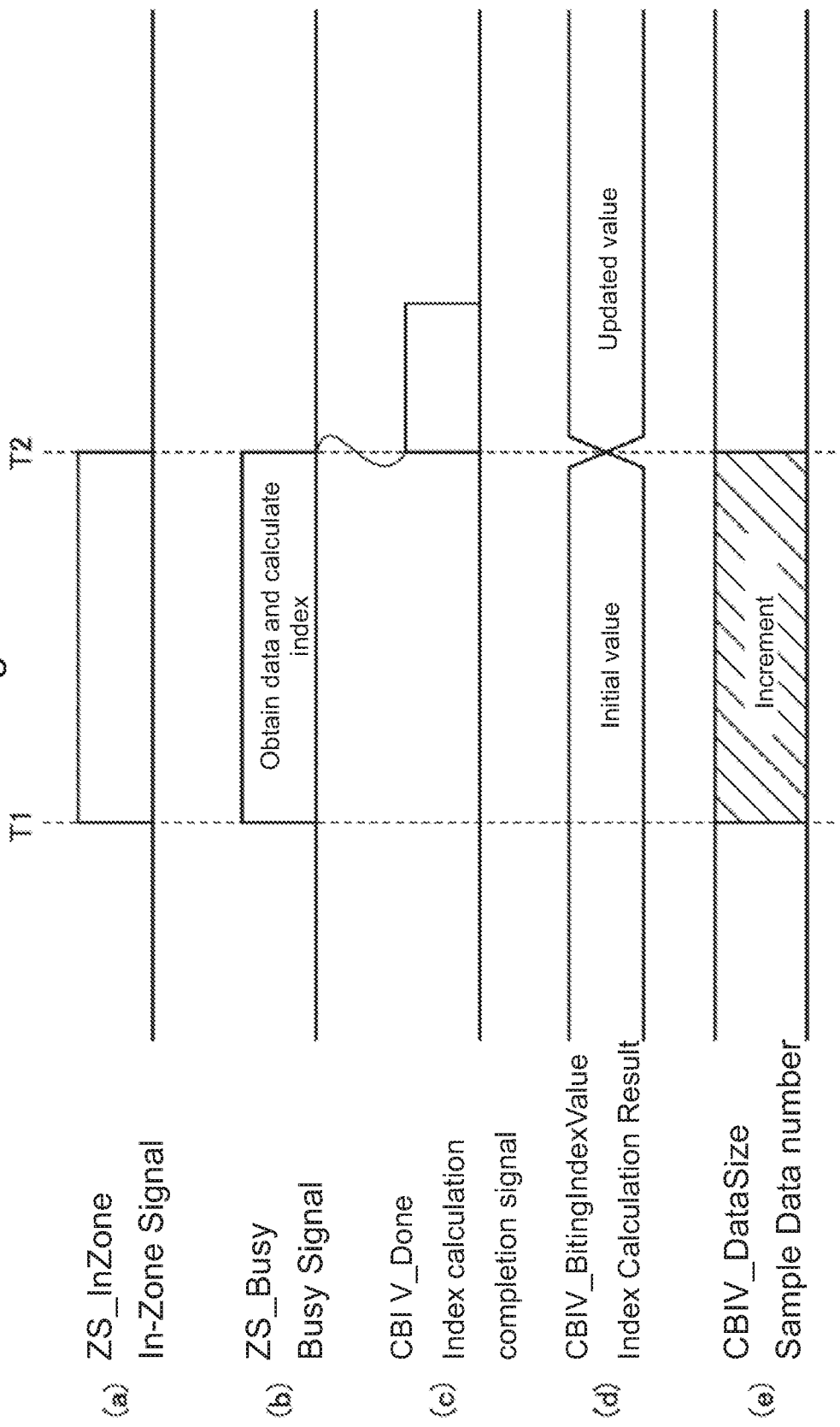

CONTROL APPARATUS, SYSTEM, AND PROGRAM LIBRARY

This application is a continuation of application Ser. No. 14/887,543, filed on Oct. 20, 2015, which is based upon and claims the benefit of priority from the prior Japanese Patent Application No. 2014-219618, filed on Oct. 28, 2014 and No. 2015-060388, filed on Mar. 24, 2015, the entire contents of all of which are incorporated herein by reference.

FIELD

The present invention relates to a control apparatus and a system for controlling a packaging machine that sequentially seals and/or cuts a packaging material using a rotor, and also relates to a program library that is implemented by the control apparatus and the system.

BACKGROUND

Machines for packaging a variety of products are used at various production sites. To maintain the quality of a variety of products (packaging targets), such packaging machines may need appropriate sealing. Techniques have been developed to evaluate sealing achieved by a packaging machine or to detect a foreign object bitten in the sealing.

Japanese Unexamined Patent Application Publication No. 2007-302261 (Patent Literature 1) describes an automatic packaging machine including a sealing mechanism that is driven by a servo motor. This automatic packaging machine compares a threshold with initially recorded reference operational data to evaluate sealing achieved by the sealing mechanism. The automatic packaging machine changes the threshold when resuming a packaging process that has been stopped.

Japanese Unexamined Patent Application Publication No. 2008-037450 (Patent Literature 2) describes an object detector included in a packaging machine. The packaging machine inserts products into a tubular film that is fed, and seals the center and the two ends of each film portion to complete individual packages. The object detector can detect an object bitten at a sealant in an end sealing mechanism of the packaging machine.

Japanese Unexamined Patent Application Publication No. 2010-006474 (Patent Literature 3) describes a packaging machine and a motor controller that are capable of detecting an object bitten in a packaging film without using sensors for object detection. Under constant disturbance surrounding the shaft of an end sealer, the packaging machine and the motor controller can detect disturbance with a smaller amplitude than the constant disturbance or can detect disturbance having delayed changes in the amplitude cycles. The packaging machine and the motor controller can achieve lower cost and smaller size, and higher reliability.

CITATION LIST

Patent Literature

Patent Literature 1: Japanese Unexamined Patent Application Publication No. 2007-302261
Patent Literature 2: Japanese Unexamined Patent Application Publication No. 2008-037450
Patent Literature 3: Japanese Unexamined Patent Application Publication No. 2010-006474

SUMMARY

Technical Problem

The techniques described in Patent Literatures 1 to 3 may have insufficient accuracy in determination and detection.

The machine described in Patent Literature 1 detects a sealing defect caused by biting of a foreign object by comparing a difference between a drive current detected by a detector and a reference drive current of the servo motor with a threshold. However, this packaging machine cannot identify the machine operation performed when a foreign object is bitten.

The machine described in Patent Literature 2 compares a predetermined reference power value with a detected power value, and determines that an object is bitten in a sealant when the detected power value exceeds the reference power value. Like the machine described in Patent Literature 1, this packaging machine cannot identify the machine operation performed when a foreign object is bitten.

The machine described in Patent Literature 3 includes a disturbance observer, which calculates a disturbance estimate value for the motor based on a torque command and a motor speed, and a foreign object detector, which detects an object being bitten around the shaft of an end sealer based on the disturbance estimate value. Although Patent Literature 3 describes use of any disturbance observer known in the art, the packaging machine can achieve sufficiently high accuracy of detection when including a disturbance observer intended for the packaging machine.

As described above, the packaging machines may need structures that enable more accurate detection of biting of a foreign object.

Solution to Problem

One aspect of the present invention provides a control apparatus for controlling a packaging machine that sequentially seals and/or cuts a packaging material using a rotor. The packaging material is transported in a first direction. The rotor is arranged to have a tangent to an outer circumference portion thereof in contact with the packaging material extending in the first direction. The rotor is drivable and rotatable by a driver. The control apparatus includes an information obtaining unit and a determination unit. The information obtaining unit obtains information indicating a rotational position of the rotor and a status value of the driver in predetermined cycles. The determination unit determines a presence of an abnormality in a processed portion of the packaging material using, from the information obtained by the information obtaining unit, a status value of the driver corresponding to a rotational position of the rotor falling within a predetermined range or being a predetermined position.

In one or more embodiments, the rotor includes at least one heater on an outer circumferential surface thereof. The heater seals the packaging material. The determination unit determines the presence of an abnormality using a status value of the driver corresponding to a range in which the heater is in contact with the packaging material.

In one or more embodiments, the rotor includes a cutter on an outer circumferential surface thereof. The cutter cuts the packaging material. The determination unit determines the presence of an abnormality using a status value of the driver corresponding to a range in which the cutter is in contact with the packaging material.

In one or more embodiments, the rotor includes at least one heater and at least one cutter on an outer circumferential surface thereof. The heater seals the packaging material. The cutter cuts the packaging material. The determination unit determines the presence of an abnormality using a combination of determination as to whether a characteristic value that is based on a status value of the driver corresponding to a range in which the heater is in contact with the packaging material satisfies a first determination criterion, and determination whether a characteristic value that is based on a status value of the driver corresponding to a range in which the cutter is in contact with the packaging material satisfies a second determination criterion.

In one or more embodiments, the determination unit identifies an individual package including an abnormality from a plurality of individual packages produced by sequentially processing the packaging material using the determination as to whether the first determination criterion is satisfied and the determination as to whether the second determination criterion is satisfied.

In one or more embodiments, the determination unit calculates, as a characteristic value that is based on a status value of the driver corresponding to a range in which the heater is in contact with the packaging material, a correlation coefficient for a difference between a value of a speed command provided to the driver and a measured speed value of the rotor.

In one or more embodiments, the determination unit calculates, as a characteristic value that is based on a status value of the driver corresponding to a range in which the cutter is in contact with the packaging material, at least one of a maximum value of a difference between a value of a speed command provided to the driver and a measured speed value of the rotor after a cutting process performed by the cutter, a minimum value of a measured torque value generated in the rotor after the cutting process performed by the cutter, a rotational position of the rotor at which the measured speed value of the rotor is at a maximum, and a rotational position of the cutter at which a measured torque value generated in the rotor is at a maximum.

Another aspect of the present invention provides a system including a packaging machine, a driver, an information obtaining unit, and a determination unit. The packaging machine sequentially seals and/or cuts a packaging material using a rotor. The packaging material is transported in a first direction. The driver drives and rotates the rotor. The rotor is arranged to have a tangent to an outer circumference portion thereof in contact with the packaging material extending in the first direction. The information obtaining unit obtains information indicating a rotational position of the rotor and a status value of the driver in predetermined cycles. The determination unit determines a presence of an abnormality in a processed portion of the packaging material using, from the information obtained by the information obtaining unit, a status value of the driver corresponding to a rotational position of the rotor falling within a predetermined range or being a predetermined position.

Another aspect of the present invention provides a program library that allows a control apparatus for controlling a driver to execute a program. The driver drives and rotates a rotor. The program library includes receiving first input information indicating that a rotational position of the rotor falls within a predetermined range or is a predetermined position, and second input information identifying one or more characteristic values to be calculated selectively from a plurality of characteristic value candidates, and calculating the one or more characteristic values specified by the second input information corresponding to a rotational position of the rotor indicated by the first input information falling within a predetermined range or being a predetermined position using a status value of the driver obtained in predetermined cycles. The plurality of characteristic value candidates include at least two of a maximum value of a difference between a value of a speed command provided to the driver and a measured speed value of the rotor, a minimum value of a measured torque value generated in the rotor, a rotational position of the rotor at which a difference between a measured speed value of the rotor and a value of a speed command provided to the driver is at a maximum, a rotational position of the rotor at which the measured torque value generated in the rotor is at a maximum, and a correlation coefficient for a difference between the value of the speed command provided to the driver and the measured speed value of the rotor.

Another aspect of the present invention provides a control apparatus for controlling a driver by executing a program using a program library. The driver drives and rotates a rotor. The program defines first input information indicating that a rotational position of the rotor falls within a predetermined range or is a predetermined position, and second input information identifying one or more characteristic values to be calculated selectively from a plurality of characteristic value candidates. The control apparatus obtains a status value of the driver in predetermined cycles, and calculates the one or more characteristic values specified by the second input information corresponding to a rotational position of the rotor indicated by the first input information falling within a predetermined range or being a predetermined position. The plurality of characteristic value candidates include at least two of a maximum value of a difference between a value of a speed command provided to the driver and a measured speed value of the rotor, a minimum value of a measured torque value generated in the rotor, a rotational position of the rotor at which a difference between the measured speed value of the rotor and the value of the speed command provided to the driver is at a maximum, a rotational position of the rotor at which the measured torque value generated in the rotor is at a maximum, and a correlation coefficient for a difference between the value of the speed command provided to the driver and the measured speed value of the rotor.

Advantageous Effects

The control apparatus and the system according to one or more embodiments of the present invention enable more accurate detection of biting of a foreign object.

BRIEF DESCRIPTION OF THE DRAWINGS

FIG. 5 is a diagram showing the structure of data stored in a buffer included in a data obtaining module shown in FIG. 4.

FIG. 8 is a diagram showing changes in the speed of rotors at different rotational positions measured using a test packaging machine.

FIG. 17 is a timing chart during execution of the user program shown in FIG. 16.

DETAILED DESCRIPTION

Figure 1:
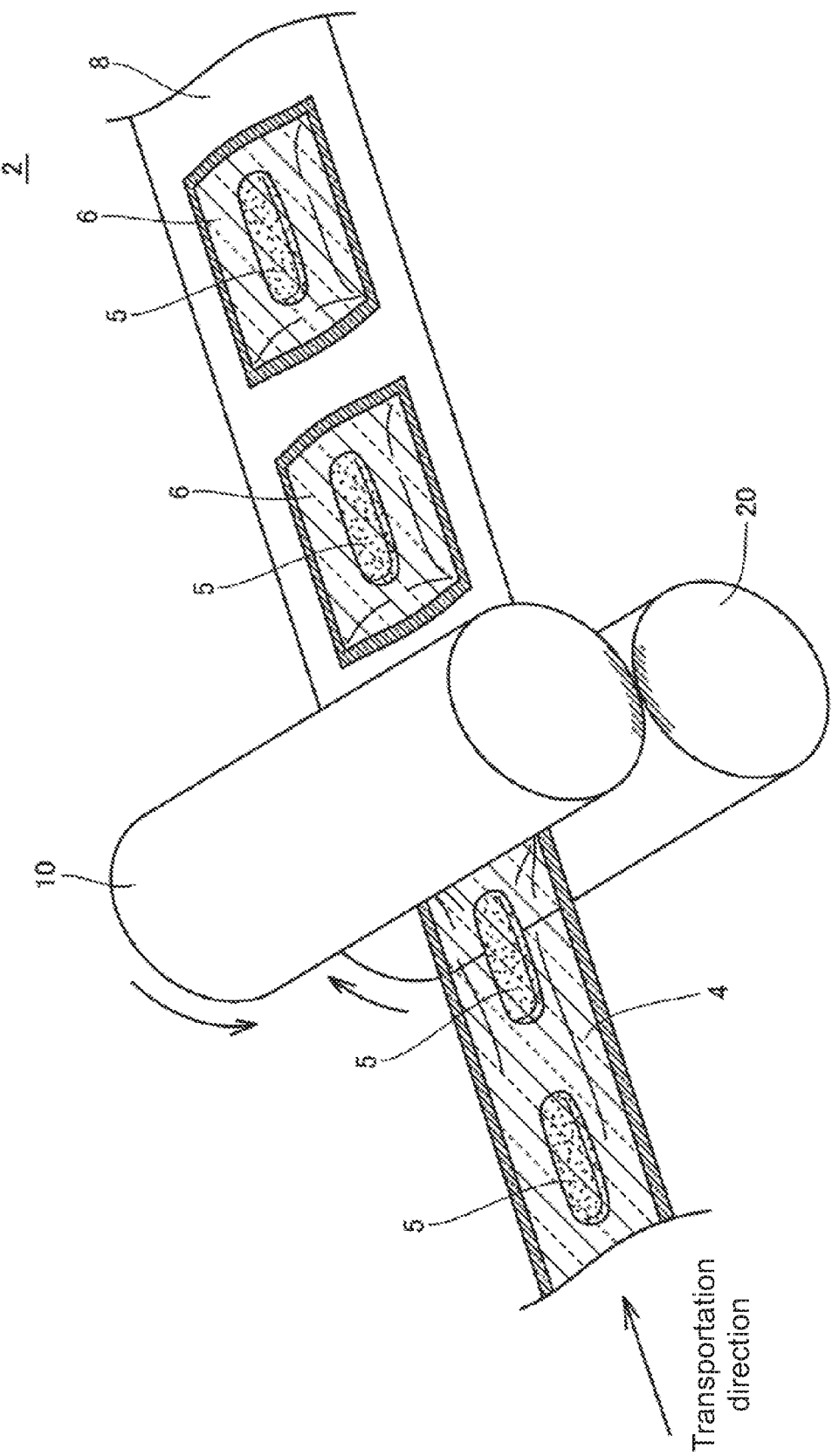
FIG. 1 is a schematic diagram showing the structure of a packaging machine according to one embodiment.

Embodiments of the present invention will now be described with reference to the drawings. The same components or the corresponding components in the figures are given the same reference numerals as those components, and will not be described repeatedly.

A. Structure of Packaging Machine and System

The structure of a packaging machine according to the present embodiment and the structure of a system including the packaging machine will now be described.

Figure 2:
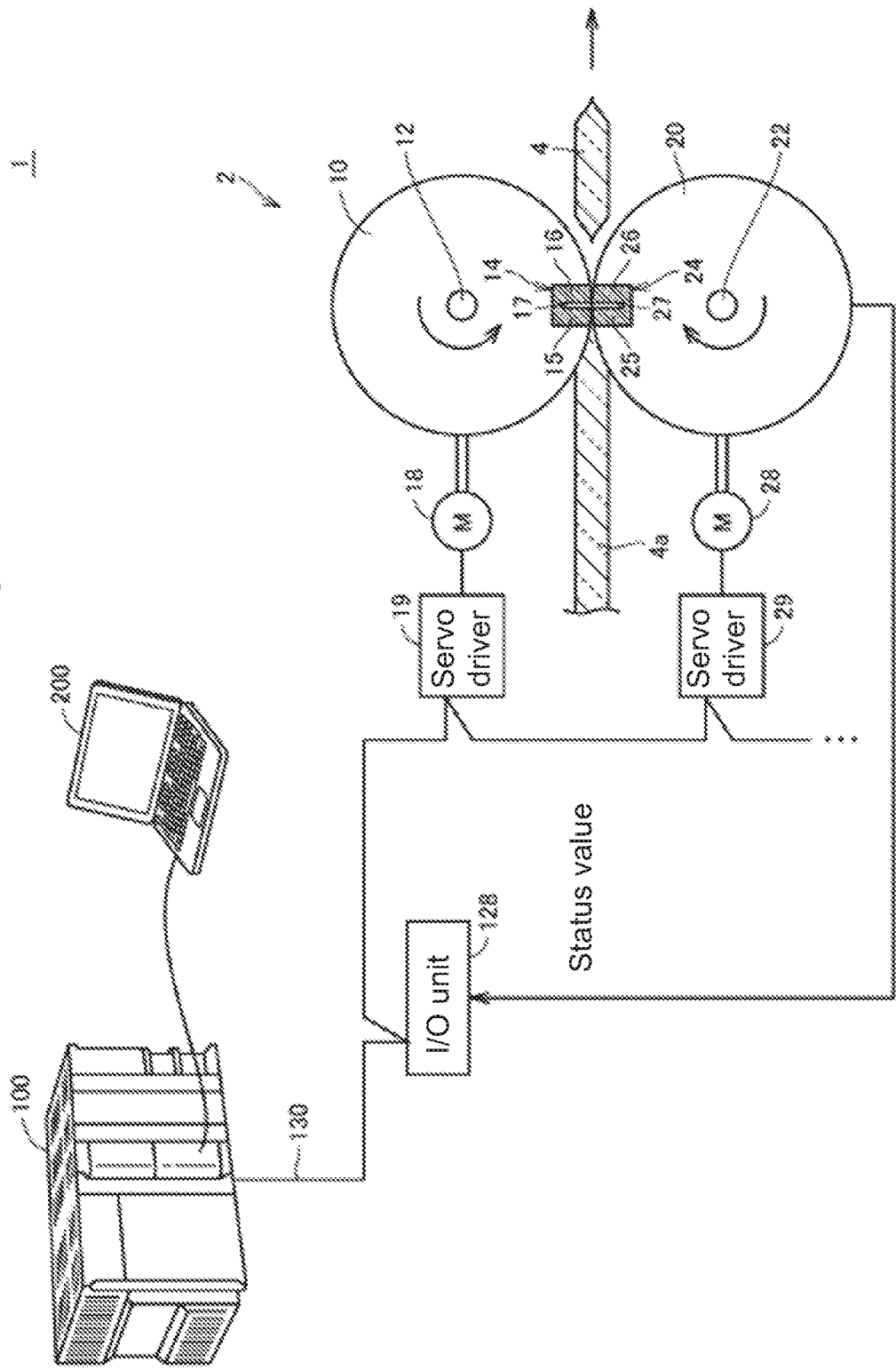
FIG. 2 is a schematic diagram showing the structure of a system including the packaging machine.

FIG. 1 is a schematic diagram showing the structure of a packaging machine 2 according to the present embodiment. FIG. 2 is a schematic diagram showing the structure of a system 1 including the packaging machine 2.

Referring now to FIG. 1, the packaging machine 2 sequentially seals and/or cuts a packaging material 4, which is transported in a predetermined direction, using rotors. The packaging machine 2 according to the present embodiment typically transports a pre-shaped, tubular packaging material 4 in a transportation direction, and seals the packaging material 4 at predetermined intervals, and also cuts the material at predetermined intervals to produce individual packages 6. Pre-shaping the packaging material 4 includes sealing the two sides of the packaging material 4 in the transportation direction. The packaging material 4 contains a plurality of packaging targets 5, which are spaced at predetermined intervals. For ease of explanation, the packaging machine 2 in the present embodiment performs both the sealing process and the cutting process. The packaging machine 2 may perform one of the sealing process and the cutting process as described below.

The packaging machine 2 includes a pair of rotors 10 and 20. The rotors 10 and 20 rotate in synchronization. Each rotor is arranged to have a tangent to its outer circumference portion in contact with the packaging material 4 extending in the transportation direction. The rotors may not be a pair of (two) rotors. A single rotor, or three or more rotors may be used. As described below, each rotor includes a heater and a cutter at predetermined positions. The heater and the cutter come in contact with the packaging material 4 to seal and cut the packaging material 4. The resultant individual packages 6 are transported downstream by a conveyor belt 8.

Referring now to FIG. 2, the system 1 includes the packaging machine 2, and a control apparatus 100 that controls the packaging machine 2. The rotors 10 and 20 in the packaging machine 2 are driven by servo motors 18 and 28 and rotate in synchronization with each other about their respective rotating shafts 12 and 22. The rotors 10 and 20 have processing mechanisms 14 and 24 arranged on their surfaces. The processing mechanism 14 includes heaters 15 and 16, which are arranged in sequence in the circumferential direction (rotational direction), and a cutter 17 arranged between the heaters 15 and 16. Similarly, the processing mechanism 24 includes heater 25 and 26, which are arranged in sequence in the circumferential direction, and a cutter 27 arranged between the heaters 25 and 26. The rotors 10 and 20 include the cutters 17 and 27 arranged on their outer circumferences to cut the packaging material 4. The cutters 17 and 27 may be eliminated in some embodiments, when the heaters alone can perform the cutting process in addition to the sealing process. The heaters may be eliminated in some other embodiments, when the cutting process alone is to be performed.

Any number of heaters may be used to seal the packaging material 4. Each of the rotors 10 and 20 may include a single heater, or three or more heaters. Each of the rotors 10 and 20 includes at least one heater on the outer circumference to seal the packaging material 4.

As the rotors 10 and 20 rotate at a speed synchronized with the transportation speed of the packaging material 4, the heaters 15 and 25 seal (bond) the facing surfaces (the upper surface and the lower surface) of the packaging material 4 on the right in the figure, and the heaters 16 and 26 seal (bond) the facing surfaces (the upper surface and the lower surface) of the packaging material 4 on the left in the figure. In parallel with this sealing process, the cutters 17 and 27 cut the packaging material 4. The packaging material 4 containing the packaging targets 5 (refer to FIG. 1) undergoes these sealing and cutting processes performed repeatedly to sequentially produce individual packages 6.

The servo motors 18 and 28 that drive and rotate the rotors 10 and 20 are examples of a driver (driver device). Servo drivers 19 and 29 control the rotational speed and the torque. More specifically, the servo drivers 19 and 29 respectively drive and rotate the rotors 10 and 20. The packaging machine 2 according to the present embodiment uses the servo motors 18 and 28 to respectively drive and rotate the rotors 10 and 20. Thus, the servo motors 18 and 28 are examples of the driver. However, the driver may be selected in accordance with an actuator that drives the rotors 10 and 20. When, for example, a stepping motor is used, a driver designed for a stepping motor is used.

The servo drivers 19 and 29 are connected to a control apparatus 100, which controls the packaging machine 2, with a field bus 130 to allow communication between them. The control apparatus 100 obtains the values indicating the status of the servo motors 18 and 28, or more specifically the measured values of the rotors 10 and 20, from the servo drivers 19 and 29. In the present embodiment, the communication through the field bus 130 is sufficiently fast and allows a command value from the control apparatus 100 and a measured value from its control target to be received substantially in the same cycle.

The control apparatus 100 mainly controls the packaging machine 2. The control apparatus 100 also evaluates the sealing (described later) and detects biting of a foreign object. In some embodiments, separate controllers may be arranged to control the packaging machine 2 and to perform the evaluation and the detection.

The control apparatus 100 according to the present embodiment may be implemented using programmable logic controllers (PLCs). The control apparatus 100 executes programs (system programs and user programs described later) prestored in the apparatus to calculate command values, which will then be provided to the servo drivers 19 and 29. The control apparatus 100 also obtains status values from the packaging machine 2 through an input-output (I/O) unit 128. More specifically, the control apparatus 100 dynamically generates appropriate command values by using the status values of the servo drivers 19 and 29 and the status values of the packaging machine 2 as feedback values, and appropriately controls the packaging machine 2 using the command values. The status values of the servo drivers 19 and 29 (or the rotors 10 and 20) include values indicating (1) the rotational position (phase and rotational angle), (2) speed, (3) acceleration, (4) torque, (5) current, and (6) voltage.

Further, the control apparatus 100 detects biting of a foreign object using the status values of the servo drivers 19 and 29 (or the rotors 10 and 20). The control apparatus 100 may also evaluate the sealing achieved by the packaging machine 2.

The control apparatus 100 allows connection to a support apparatus 200, which is enabled to upload (or update) programs onto the control apparatus 100 or download programs from the control apparatus 100 and to check the status values of the control apparatus 100. The support apparatus 200 typically has a development environment in which programs to be executed by the control apparatus 100 (normally user programs) can be generated. The support apparatus 200 can thus be used to generate a user program for implementing processing intended for its control target (the packaging machine 2 in the example shown in FIG. 2). The generated user program is transferred from the support apparatus 200 to the control apparatus 100. An example of the user program will be described later.

The support apparatus 200 is typically a general-purpose personal computer that executes application programs. The hardware configuration of the general-purpose personal computer is known in the art, and will not be described in detail.

B. Hardware Configuration of Control Apparatus 100

Figure 3:
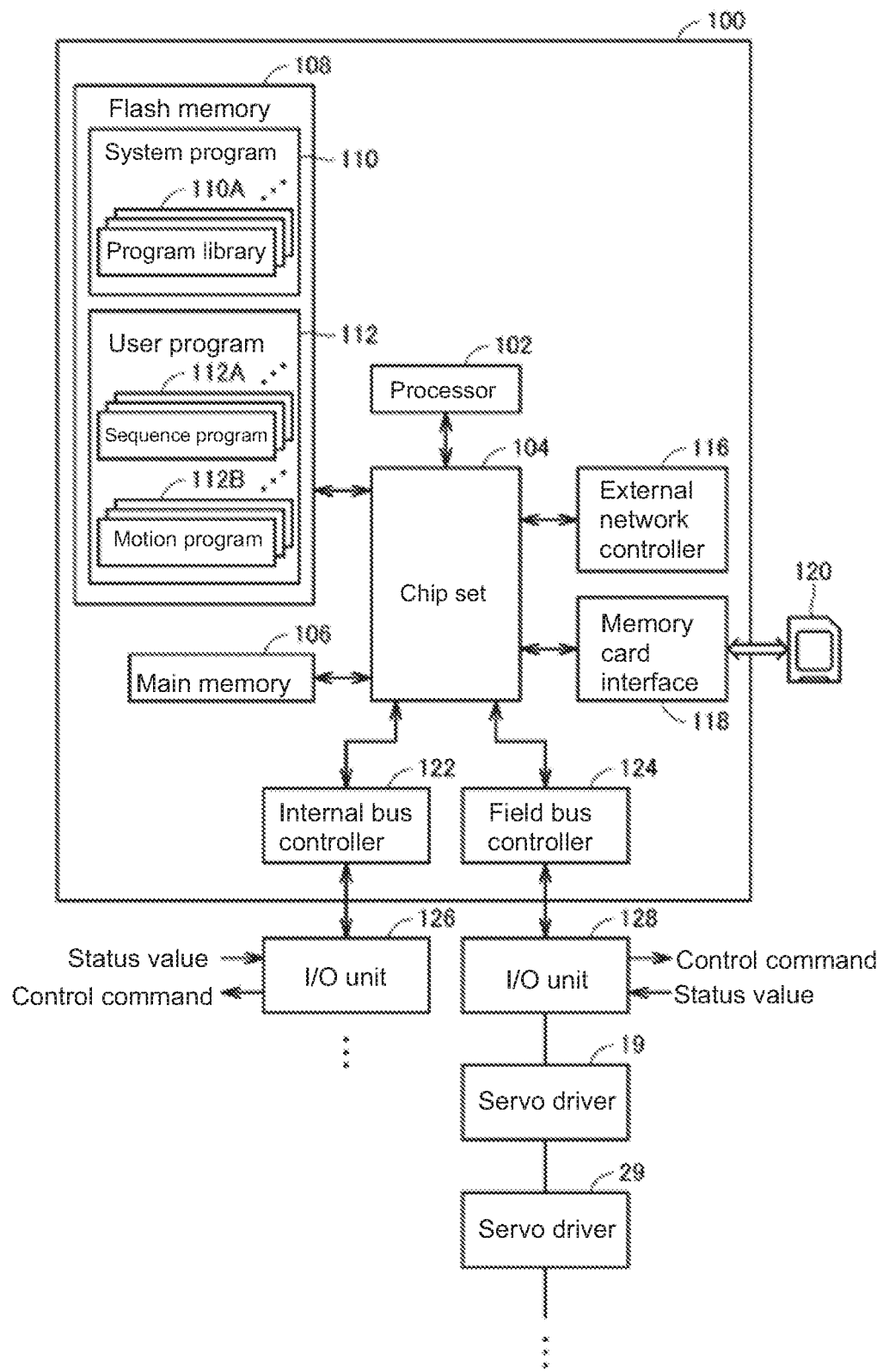
FIG. 3 is a schematic diagram showing the hardware configuration of a control apparatus shown in FIG. 1.

The hardware configuration of the control apparatus 100 will now be described. FIG. 3 is a schematic diagram showing the hardware configuration of the control apparatus 100 shown in FIG. 1 in one embodiment. Referring to FIG. 3, the control apparatus 100 controls a control target using a processor executing programs preinstalled in the apparatus. More specifically, the control apparatus 100 includes a processor 102, such as a central processing unit (CPU) or a micro processing unit (MPU), a chip set 104, a main memory 106, a flash memory 108, an external network controller 116, a memory card interface 118, an internal bus controller 122, and a field bus controller 124.

The processor 102 reads a system program 110 and a user program 112 stored in the flash memory 108, and expands the programs in the main memory 106 and executes the programs to control the control target. The system program 110 includes instruction code to provide basic capabilities of the control apparatus 100, such as input and output of data and execution timing control. In the present embodiment, the system program 110 includes program libraries 110A. Each program library 110A stores general-purpose processes that are reusable. Each program library 110A is invoked (called or invoked) as needed during execution of the user program 112. Each program library 110A is used as needed when a program is executed in the control apparatus 100.

The user program 112 is designed freely for a control target. The user program 112 includes sequence programs 112A, which are used to execute sequence control, and motion programs 112B, which are used to execute motion control. The sequence programs 112A and the motion programs 112B are executed by invoking the program libraries 110A as needed.

The chip set 104 controls the components to perform the overall processing of the control apparatus 100.

The internal bus controller 122 is an interface via which data is transmitted between the control apparatus 100 and the I/O unit 126, which are connected through an internal bus. The field bus controller 124 is an interface via which data is transmitted between the control apparatus 100 and the I/O unit 128, which are connected through the field bus 130 (FIG. 2). The internal bus controller 122 and the field bus controller 124 obtain the status values input into the corresponding I/O units 126 and 128, and output the computation results obtained in the processor 102 to the corresponding I/O units 126 and 128 as command values.

The external network controller 116 controls data transmission through various wired and wireless networks. The memory card interface 118 can removably receive a memory card 120. The memory card interface 118 can write and read data to and from the memory card 120.

The capabilities of the control apparatus 100 achieved by executing programs may be partly or entirely implemented by dedicated hardware circuits.

C. Functional Configuration of Control Apparatus 100

The functional configuration of the control apparatus 100 according to the present embodiment to detect biting of a foreign object will now be described. The capabilities of the control apparatus 100 to evaluate the sealing achieved by the packaging machine 2 to will also be described.

Figure 4:
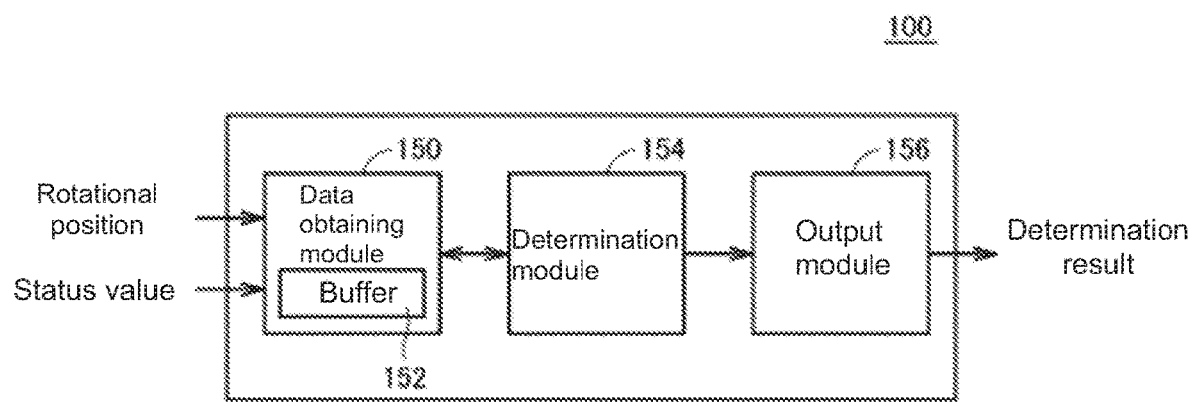
FIG. 4 is a functional block diagram of the control apparatus shown in FIG. 1.

FIG. 4 is a functional block diagram of the control apparatus 100 shown in FIG. 1. As shown in FIG. 4, the control apparatus 100 includes a data obtaining module 150, a determination module 154, and an output module 156. These modules are typically achieved by the processor 102 executing programs.

The data obtaining module 150 obtains the status values indicating the operation of the packaging machine 2. The determination module 154 includes a buffer 152 that stores the obtained status values. More specifically, the data obtaining module 150 obtains the rotational positions of the rotors 10 and 20 and the status values of the servo drivers 19 and 29 in predetermined cycles.

The determination module 154 determines the presence of an abnormality (e.g., biting of a foreign object or a sealing defect) in a sealed portion of the packaging material 4 using, from the data obtained by the data obtaining module 150, the status values of the servo drivers 19 and 29 corresponding to the rotational positions of the rotors 10 and 20 falling within a predetermined range or being predetermined positions.

The output module 156 outputs a determination result obtained by the determination module 154 (e.g., detecting biting of a foreign object or a sealing defect). The output module 156 may output its determination result to a device that notifies a detected abnormality to the operator of the packaging machine 2 with light or a sound, or to a host computer that manages the system 1.

FIG. 5 is a diagram showing the structure of data stored in a buffer 152 included in the data obtaining module 150 shown in FIG. 4. Referring to FIG. 5, the buffer 152 stores the status values of the servo motors 18 and 28 (or the status values of the rotors 10 and 20) obtained in predetermined cycles. The control apparatus 100 according to the present embodiment can obtain a plurality of status values at each time.

The control apparatus 100 can thus determine the presence of an abnormality while reflecting the relative positional relationship between the processing mechanisms 14 and 24 arranged on the outer circumferential surfaces of the rotors 10 and 20 and the packaging material 4.

D. Abnormality Detection in Packaging Machine

An abnormality detectable by the control apparatus 100 according to the present embodiment and a method for detecting an abnormality will now be described.

Figure 6A:
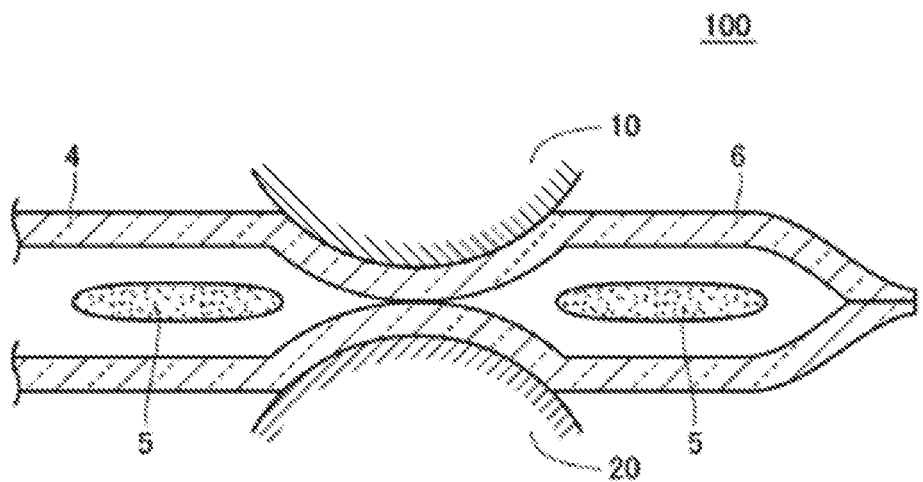
FIGS. 6A and 6B are schematic diagrams describing a sealing process and a cutting process performed by the packaging machine according to the embodiment.
Figure 6B:
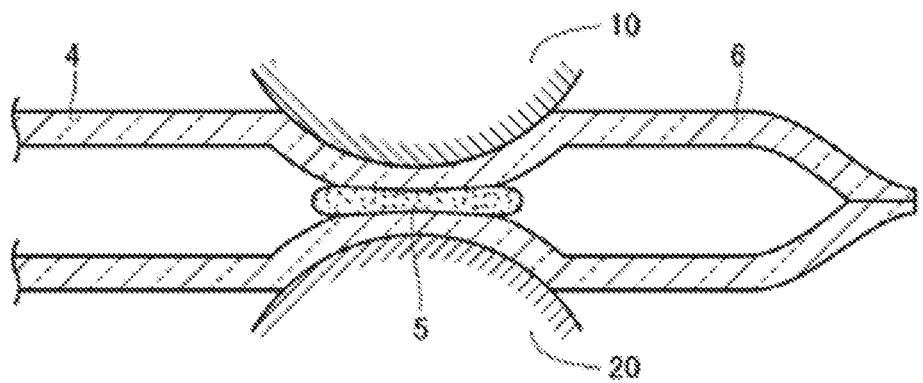

FIGS. 6A and 6B are schematic diagrams describing a sealing process and a cutting process performed by the packaging machine 2 according to the present embodiment. FIG. 6A shows the state in which the sealing process and the cutting process are performed correctly, whereas FIG. 6B shows the state in which the sealing process and the cutting process are performed incorrectly.

As shown in FIG. 6A, the packaging material 4, containing packaging targets 5 arranged at predetermined intervals, undergoes the sealing process and the cutting process that are performed correctly. This produces the individual packages 6.

As shown in FIG. 6B, the packaging material 4 may contain packaging targets 5 at incorrect intervals or at incorrect positions. In this case, the packaging material 4 may have a packaging target 5 arranged in its portion to be sealed. The resultant seal would be insufficiently tight. This failure is referred to as biting of the packaging target 5 in the sealed portion of the packaging material 4. This biting to be detected by the control apparatus 100 according to the present embodiment is not limited to the example case shown in FIG. 6B, but includes the presence of an object other than the packaging target 5 (including air) between portions of the packaging target 5 to be bonded together.

Figure 7A:
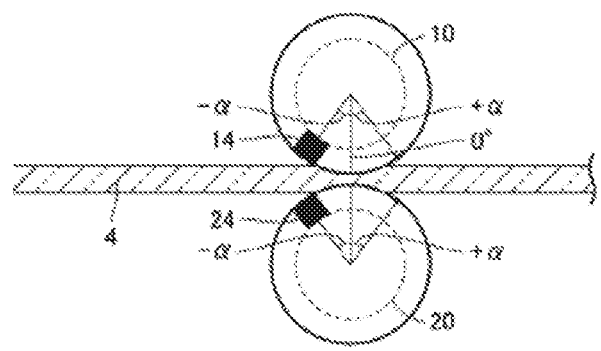
FIGS. 7A to 7C are diagrams describing a method for detecting an abnormality in the embodiment.
Figure 7B:
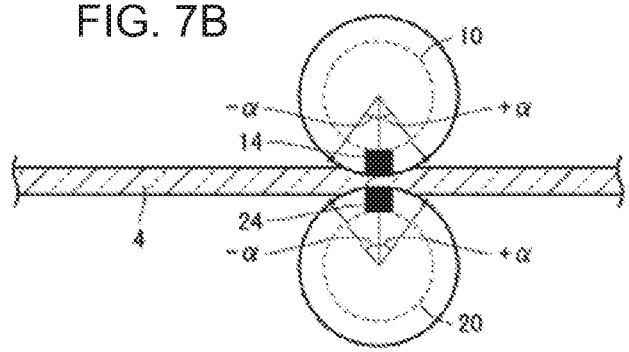
Figure 7C:
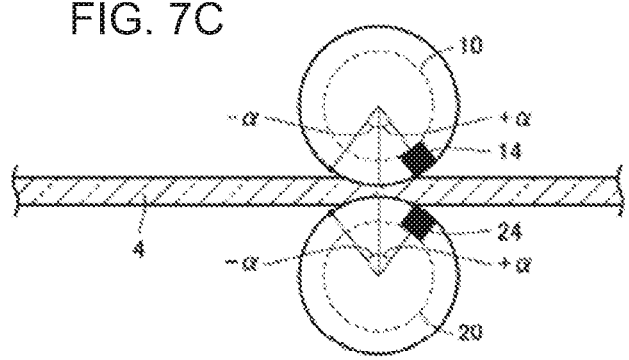

FIGS. 7A to 7C are diagrams describing a method for detecting an abnormality in the present embodiment. FIG. 7A shows the processing mechanisms 14 and 24 arranged on the surfaces of the rotors 10 and 20 that start coming in contact with the packaging material 4. FIG. 7C shows the processing mechanisms 14 and 24 arranged on the surfaces of the rotors 10 and 20 that end their contact with the packaging material 4. FIG. 7B shows the state between the states shown in FIG. 7A and FIG. 7C.

In FIG. 7B, the processing mechanism 14 is arranged at the lowest position, and the processing mechanism 24 is arranged at the highest position. This state is used as a reference (the rotational position is 0° for ease of explanation). In FIG. 7A, the processing mechanisms 14 and 24 arranged on the surfaces of the rotors 10 and 20 start coming in contact with the packaging material 4. In this state, the rotors are at the rotational position of $-\alpha$. In FIG. 7C, the processing mechanisms 14 and 24 end their contact with the packaging material 4. In this state, the rotors are at the rotational position of $+\alpha$. More specifically, the processing mechanisms 14 and 24 are in contact with the packaging material 4 while the rotors are at rotational positions within the range of $-\alpha$ to $+\alpha$. In the present embodiment, an abnormality is detected using the status values corresponding to the rotational positions of the rotors 10 and 20 falling within the range of $-\alpha$ to $+\alpha$ (the status values may not be obtained from the entire range of rotational positions). In other words, the control apparatus 100 according to the present embodiment determines the presence of an abnormality in a sealed portion of the packaging material 4 based on the status values of the drivers corresponding to the rotational positions of the rotors 10 and 20 falling within the predetermined range or being predetermined rotational positions.

More specifically, the packaging material 4 at least starts the sealing process when the rotors 10 and 20 are at the rotational position of $-\alpha$ (FIG. 7A). After the rotors 10 and 20 are at the rotational position of $+\alpha$ (FIG. 7C), the processing mechanisms 14 and 24 have negligible effects on the packaging material 4. Due to this physical phenomenon, the presence of an abnormality may be determined using the status values obtained while the processing mechanisms 14 and 24 are affecting the packaging material 4.

E. Logic for Specific Abnormality Determination

The logic for determining an abnormality in specific cases will now be described in detail. The inventors measured various status values during biting using a testing packaging machine. FIG. 8 shows the test results. FIG. 8 is a graph showing changes in the speed of rotors at different rotational positions measured using the test packaging machine. FIG. 8 shows the statistical values indicating the results obtained through repeated measurements under the test conditions described below. FIG. 8 shows the measurement results during normal operation and during operation involving biting. In the figure, each broken line indicates the position at which a foreign object is bitten.

Packaging Speed: 60 cpm
Packaging Material: paper
Packaging Material Thickness: 0.1, 0.3, and 0.5 mm
Measurement Method: each packaging material with a different thickness undergoes measurements 100 times
Foreign Object to be Bitten: paper (with a thickness of 0.1 mm)

As shown in FIG. 8, zone 1 refers to the range in which the heaters 15 and 25 arranged on the surfaces of the rotors 10 and 20 are in contact with the packaging material. Zone 2 refers to the range in which the cutters 17 and 27 arranged on the surfaces of the rotors 10 and 20 are in contact with the packaging material. Zone 3 refers to the range in which the heaters 16 and 26 arranged on the surfaces of the rotors 10 and 20 are in contact with the packaging material. In each of these zones, the presence of an abnormality can be determined using the values described below.

Although FIG. 8 shows areas belonging to no zones between zones 1 and 2 and between zones 2 and 3, such areas may not be formed. In other words, zones 1, 2, and 3 may be defined continuous from one another (or in other words adjacent to each other).

(1) Zone 1

Zone 1 is the range in which the heaters 15 and 25 are in contact with the packaging material 4. The control apparatus 100 determines the presence of an abnormality based on the status values of the servo drivers 19 and 29 located in this range. More specifically, the control apparatus 100 uses a correlation coefficient for a speed deviation as a characteristic value for detecting an abnormality in zone 1. The speed deviation is a difference between a command value provided from the control apparatus 100 to the servo motors 18 and 28, and a measured speed value of the servo drivers 19 and 29. As described above, the control apparatus 100 can receive a command value and its feedback value (measured value) in the same control cycle, and thus can calculate the speed deviation in each control cycle. The control apparatus 100 calculates a correlation coefficient for a difference between a value of a speed command provided to the servo drivers 19 and 29 and a measured speed value of the rotors 10 and 20 as a characteristic value based on the status values of the servo drivers 19 and 29 corresponding to the range in which the heaters 15 and 25 are in contact with the packaging material 4.

A correlation function F(T) that is used to calculate the correlation coefficient for the speed deviation is calculated using formula 1 below.

Formula 1

$$F(\sigma) = \int_0^T V(t) * V(t-\sigma) dt \tag{1}$$

In this formula, V(t) represents the speed deviation, and 0 to T represent times corresponding to zone 1.

Figure 9:
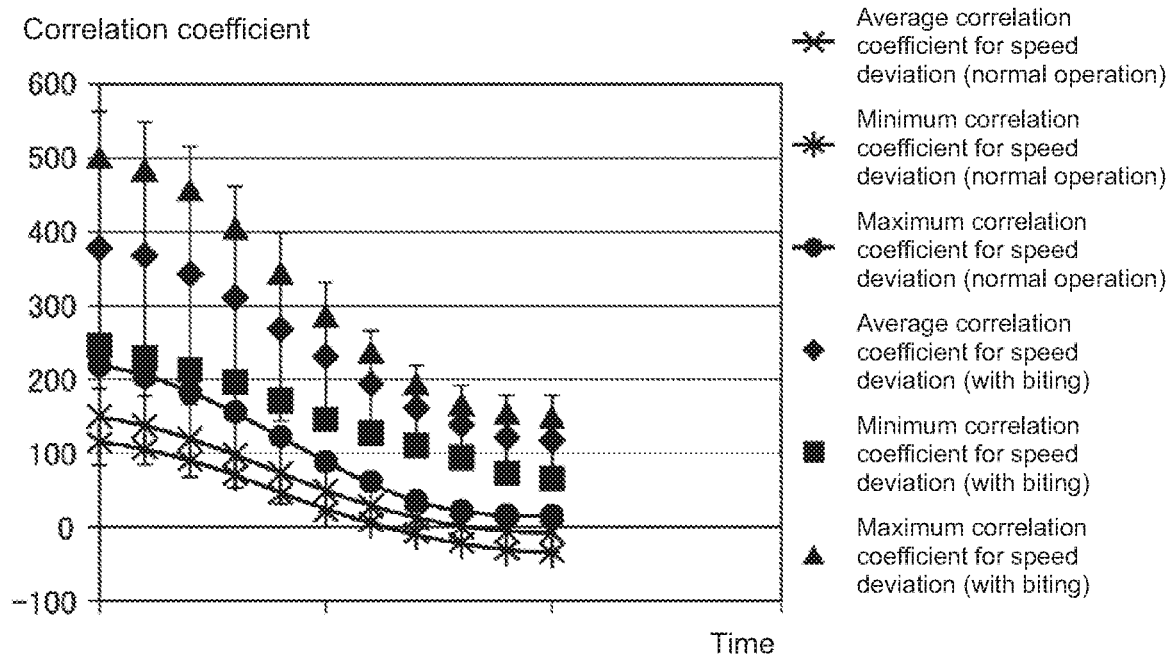
FIG. 9 is a graph showing the correlation coefficient for zone 1 calculated using the measurement results shown in FIG. 8.
Figure 10:
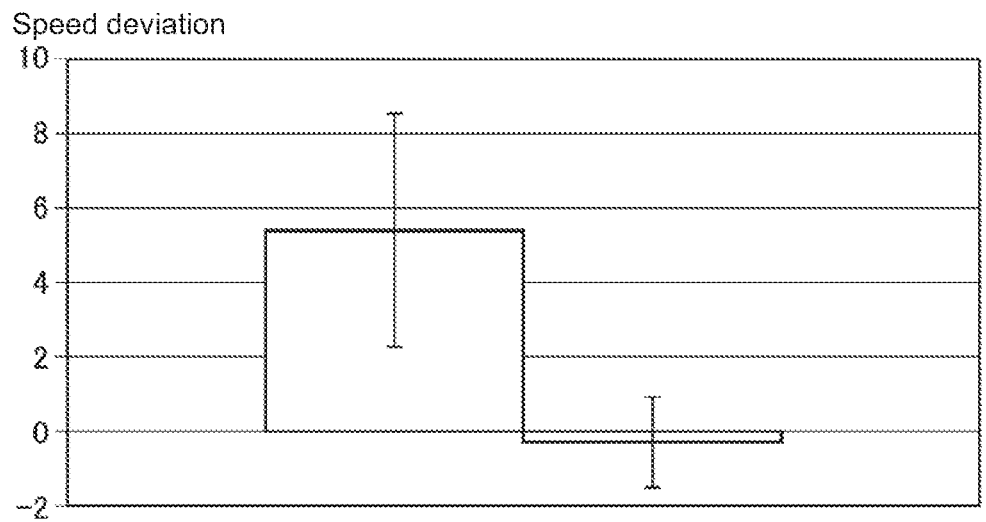
FIG. 10 is a graph showing the differing maximum speed deviation values for zone 2 after the cutting process calculated using the measurement results shown in FIG. 8.

FIG. 9 is a graph showing the correlation coefficient for the speed deviation during normal operation and during operation involving biting, calculated using formula 1 above. FIG. 9 is a graph showing the correlation coefficient for zone 1 calculated using the measurement results shown in FIG. 8. FIG. 10 shows the range of errors for the entire samples using bars. Each bar represents the error range of 6σ (six standard deviations).

As shown in FIG. 9, a sufficiently significant difference is observed between the normal operation and the operation involving biting, particularly in the latter portion with relatively small deviations (the area circled with a solid line in the figure). In other words, the presence of an abnormality can be detected particularly in the preceding sealing process by sequentially calculating the correlation coefficient for the speed deviation.

The correlation coefficient for the speed deviation indicates the degree of deviation between the command value (speed command) and the feedback value (measured value). With no foreign object being bitten, the rotors 10 and 20 rotate without being disturbed. In this case, the feedback value will follow the command value. The calculated correlation coefficient will be a relatively high value. With a foreign object being bitten, the rotors 10 and 20 are disturbed while rotating. In this case, the feedback value will follow the command value by a lesser degree. The calculated correlation coefficient will have a relatively low value. Thus, as shown in FIG. 9, the correlation coefficient for the speed deviation is responsive to biting of a foreign object.

As described above, the control apparatus 100 according to the present embodiment determines the presence of an abnormality in zone 1 based on the correlation coefficient for the speed deviation in this zone. The determination criterion (typically a threshold) for the correlation coefficient for the speed deviation shown in FIG. 9 may be set based on several measurement results obtained through actual measurements during normal operation. More specifically, the determination criteria for determining the presence of an abnormality in zone 1 may be a statistical value (e.g., an average value or a standardized value) calculated using the correlation coefficient for the speed deviation (FIG. 9) measured during normal operation.

The presence of an abnormality in zone 1 may be determined using (a) a minimum value of a speed deviation (in the zone), (b) a maximum value of a measured torque value (in the zone), or (c) an integral of a measured torque value (in the zone), in addition to or in place of the correlation coefficient for the speed deviation. (a) The minimum value of the speed deviation can be used to detect biting of a foreign object, because a difference between a command value (speed command) and a feedback value (measured value) is determined based on whether a foreign object is bitten. (b) The maximum value of the measured torque value can be used to detect biting of a foreign object, because a torque to be used is determined based on whether a foreign object is bitten. (c) The integral of the measured torque value can be used to detect biting of a foreign object in the same manner as for (b) the maximum value of the measured torque value, because a torque to be used is determined based on whether a foreign object is bitten. (c) The integral of the measured torque value allows evaluation of the entire zone, instead of evaluation using an increase in the local torque. In other words, a statistical value (e.g., an average value or a standardized value) calculated from at least one of the above parameter values (a) to (c) measured during normal operation can be used as the determination criterion for determining the presence of an abnormality in zone 1.

(2) Zone 2

Zone 2 is the range in which the cutters 17 and 27 are in contact with the packaging material 4. The control apparatus 100 determines the presence of an abnormality based on the status values of the servo drivers 19 and 29 in this zone. More specifically, the control apparatus 100 uses at least one of a maximum value of a speed deviation after the cutting process, a minimum value of a measured torque value after the cutting process, a rotational position (phase and rotational angle) at which the measured speed value is at the maximum, and a rotational position (phase and rotational angle) at which the measured torque value is at the maximum as a characteristic value for detecting an abnormality in zone 2. In other words, a statistical value (e.g., an average value or a standardized value) calculated from at least one of the above parameter values measured during normal operation can be used as the determination criterion for determining the presence of an abnormality in zone 2.

2-1 Characteristic Value After Cutting Process

The cutting process performed correctly by the cutters 17 and 27 will reduce the subsequent load to disturb the rotation of the rotors 10 and 20. If a foreign object is present on a packaging material portion to undergo the cutting process, the rotors 10 and 20 will subsequently receive a load applied in accordance with the foreign object after the cutting process. Thus, the presence of an abnormality can be determined using an index of the rotational state of the rotors 10 and 20 after the cutting process. In one example, the presence of an abnormality may be detected using (i) the maximum value of the speed deviation after the cutting process and (ii) the minimum value of the measured torque value after the cutting process.

The speed deviation is an index of a difference between a command value (speed command) and a feedback value (measured value). The value of the speed deviation is determined based on whether a foreign object is bitten. The measured torque value is also determined based on whether a foreign object is bitten.

Figure 11:
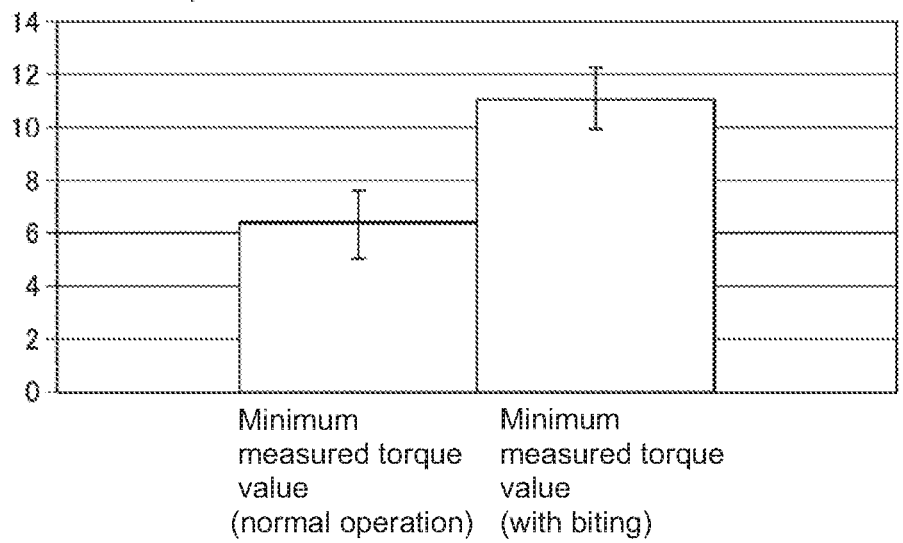
FIG. 11 is a graph showing the differing minimum measured torque values for zone 2 after the cutting process calculated using the measurement results shown in Fig.

FIG. 10 is a diagram showing the differing maximum values of the speed deviation after the cutting process for zone 2 calculated using the measurement results shown in FIG. 8. FIG. 11 is a diagram showing the differing minimum values of the measured torque value after the cutting process for zone 2 calculated using the measurement results shown in FIG. 8. FIGS. 10 and 11 each show the range of errors for the entire samples using bars. Each bar represents the error range of 6σ (six standard deviations).

As shown in FIG. 10, a sufficiently significant difference is observed in the maximum value of the speed deviation after the cutting process between the normal operation and the operation involving biting in zone 2. More specifically, the presence of an abnormality in the cutting process can be determined by sequentially calculating the maximum value of the speed deviation after the cutting process.

Further, a sufficiently significant difference is observed in the rotational position (phase and rotational angle) at which the speed deviation after the cutting process is at the maximum in zone 2 between the normal operation and the operating involving biting of a foreign object. The presence of an abnormality in the cutting process can be determined by sequentially calculating the rotational position (phase and rotational angle) at which the speed deviation after the cutting process is at the maximum, or by sequentially calculating the rotational position (phase and rotational angle) at which the (v) speed deviation is at the maximum.

As shown in FIG. 11, a sufficiently significant difference is observed in the minimum value of the measured torque value after the cutting process between the normal operation and the operating involving biting of a foreign object in zone 2. More specifically, the presence of an abnormality particularly in the cutting process can be determined by sequentially calculating the minimum value of the measured torque value after the cutting process.

The determination criteria (typically, thresholds) for the speed deviation after the cutting process shown in FIG. 10 and for the measured torque value after the cutting process shown in FIG. 11 may be determined based on several measurement results obtained in advance during normal operation.

2-2 Rotational Position (Phase and Rotational Angle) at Which Measured Speed Value and Measured Torque Value are at the Maximum When the cutting process is correctly performed by the cutters 17 and 27, the load applied to the rotors 10 and 20 is basically constant before and after the cutting process. If a foreign object is present on any portion to be cut, a larger load is applied from the portion with the foreign object to the rotors 10 and 20. More specifically, (iii) the rotational position (phase and rotational angle) at which the measured speed value is at the maximum and (iv) the rotational position (phase and rotational angle) at which the measured torque value is at the maximum will change depending on the portion with a foreign object. The presence of an abnormality particularly in the cutting process can be determined by sequentially calculating the rotational position at which the measured speed value and the measured torque value are at the maximum.

Figure 12:
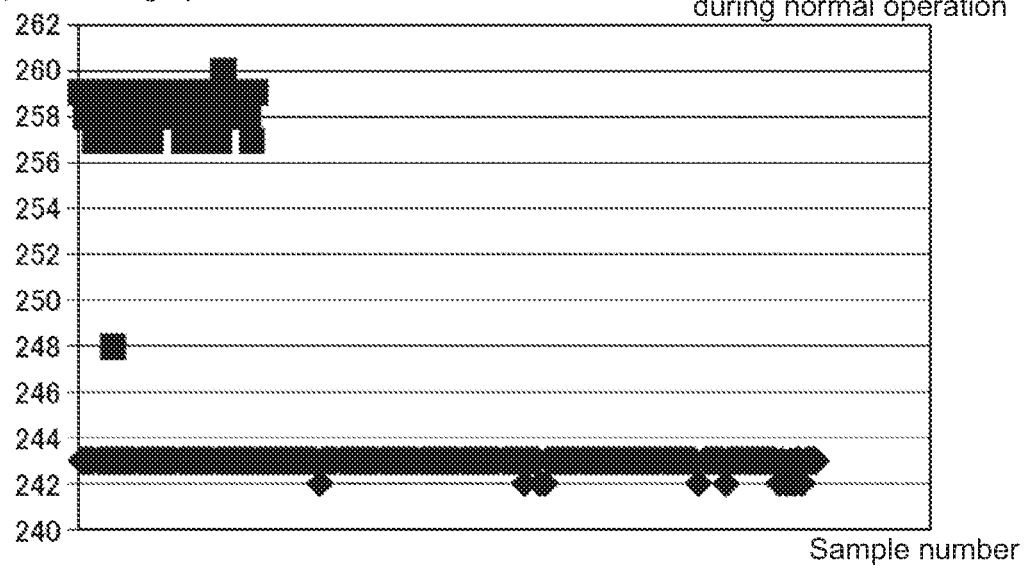
FIG. 12 is a graph showing the differing rotational positions (phase and rotational angle) at which a measured speed value for zone 2 calculated using the measurement results shown in FIG. 8 is at the maximum.
Figure 13:
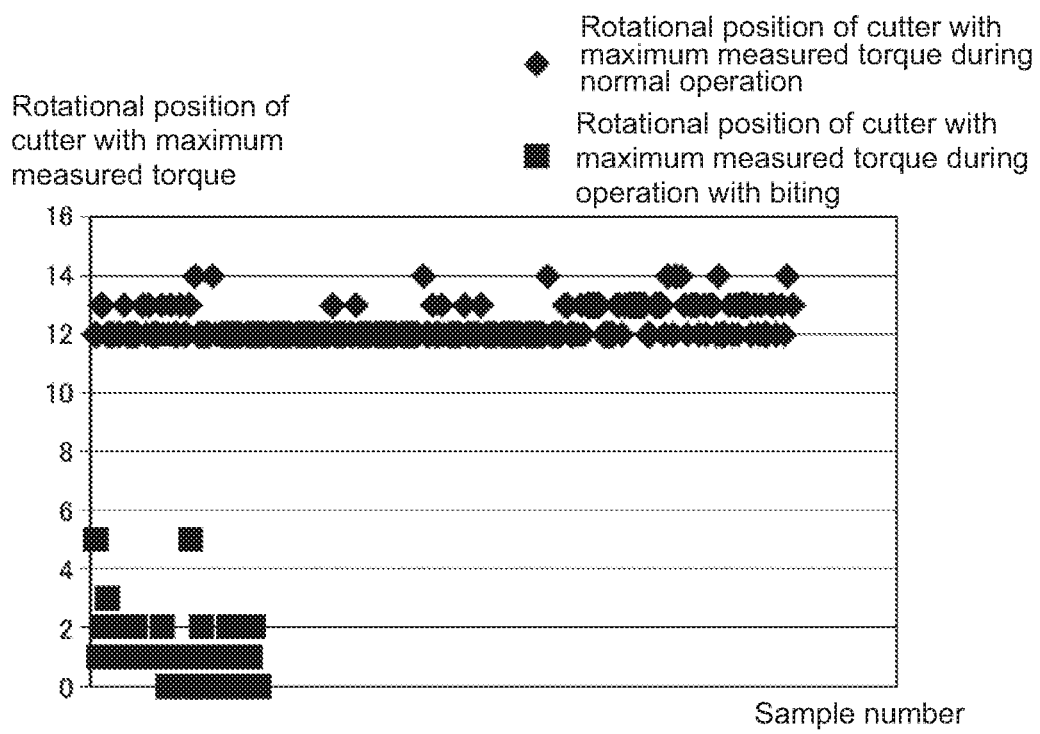
FIG. 13 is a diagram showing the differing rotational positions of the cutter (phase and rotational angle) at which a measured torque value for zone 2 calculated using the measurement results shown in FIG. 8 is at the maximum.

FIG. 12 shows the differing rotational positions (phase and rotational angle) at which the measured speed value is at the maximum in zone 2 calculated using the measurement results shown in FIG. 8. FIG. 13 shows the differing rotational positions (phase and rotational angle) of the cutter at which the measured torque value in zone 2 calculated using the measurement results shown in FIG. 8 is at the maximum.

As shown in FIG. 12, a sufficiently significant difference is observed in the rotational position at which the measured speed value is at the maximum for zone 2 between the normal operation and the operating involving biting of a foreign object. In other words, the presence of an abnormality particularly in the cutting process can be determined by sequentially calculating the rotational position at which the measured speed value is at the maximum.

As shown in FIG. 13, a sufficiently significant difference is observed in the rotational position at which the measured torque value is at the maximum in zone 2 between the normal operation and the operating involving biting of a foreign object. In other words, the presence of an abnormality particularly in the cutting process can be determined by sequentially calculating the rotational position at which the measured torque value is at the maximum.

The determination criteria (typically, thresholds) for the rotational position at which the measured speed value is at the maximum shown in FIG. 12 and the rotational position of the cutter at which the measured torque value is at the maximum shown in FIG. 13 may be determined based on several measurement results obtained in advance during normal operation.

As described above, the control apparatus 100 calculates, as a characteristic value based on the status values of the servo drivers 19 and 29 corresponding to the range in which the cutters 17 and 27 are in contact with the packaging material 4, at least one of (i) the maximum value of the speed deviation after the cutting process, which is the maximum value of the difference between the value of the speed command provided to the servo drivers 19 and 29 after the cutting process performed by the cutters 17 and 27 and the measured speed value of the rotors 10 and 20, (ii) the minimum value of the measured torque value after the cutting process, which is the minimum value of the measured torque value generated in the rotors 10 and 20 after the cutting process performed by the cutters 17 and 27, (iii) the rotational position (phase and rotational angle) at which the measured speed value is at the maximum, which is the rotational position of the rotors 10 and 20 at which the measured speed value of the rotors 10 and 20 is at the maximum, (iv) the rotational position (phase and rotational angle) of the cutter at which the measured torque value is at the maximum, which is the rotational position of the rotors 10 and 20 at which the measured torque value generated in the rotors 10 and 20 is at the maximum, and (v) the rotational position (phase and rotational angle) at which the speed deviation is at the maximum, which is the rotational position (phase and rotational angle) of the cutter at which the difference between the value of the speed command provided to the servo drivers 19 and 29 after the cutting process performed by the cutters 17 and 27 and the measured speed value of the rotors 10 and 20 is at the maximum.

The presence of an abnormality in zone 2 may be determined using a difference between the maximum value and the minimum value of the measured speed value, in addition to or in place of the above characteristic values.

(3) Zone 3

Zone 3 is the range in which the heaters 16 and 26 are in contact with the packaging material 4. The control apparatus 100 determines the presence of an abnormality based on the status values of the servo drivers 19 and 29 in this zone. More specifically, the control apparatus 100 uses the correlation coefficient for the speed deviation as a characteristic value for detecting an abnormality in zone 3, in the same manner as for zone 1 described above. The correlation coefficient for the speed deviation can be calculated by using formula (1) described above. In formula (1), 0 to T indicate times corresponding to zone 3.

More specifically, the control apparatus 100 calculates a correlation coefficient for a difference between the value of the speed command provided to the servo drivers 19 and 29 and the measured speed value of the rotors 10 and 20 as a characteristic value based on the status values of the servo drivers 19 and 29 corresponding to the range in which the heaters 16 and 26 are in contact with the packaging material 4.

Figure 14:
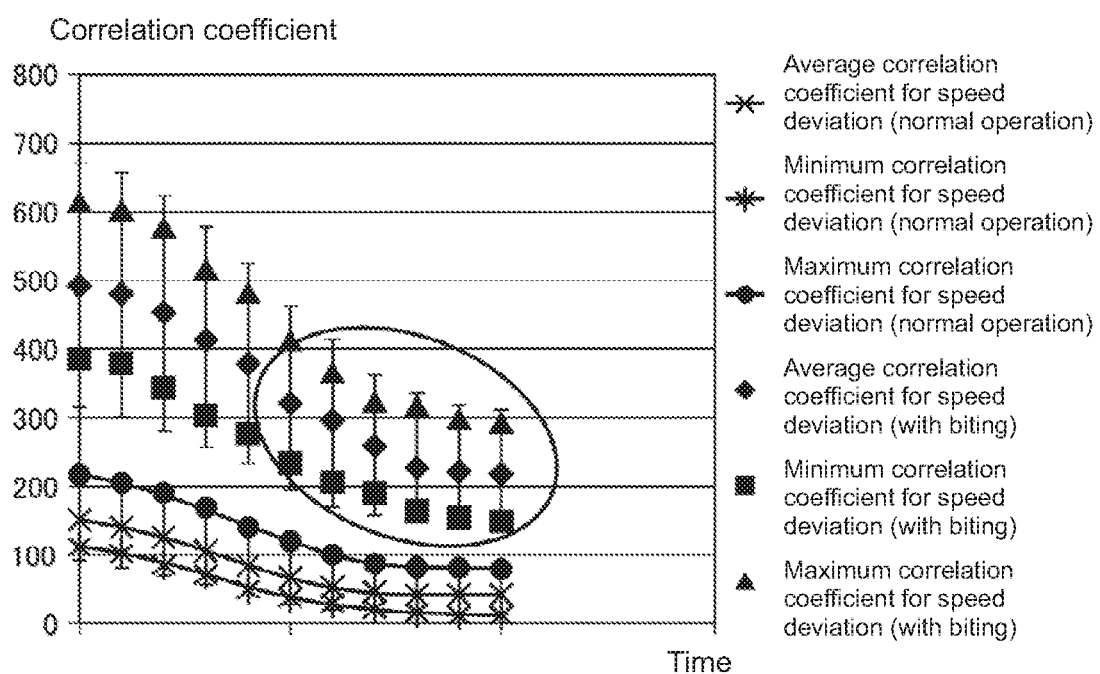
FIG. 14 is a diagram showing the correlation coefficient for zone 3 calculated using the measurement results shown in FIG. 8.

FIG. 14 is a graph showing the correlation coefficient for the speed deviation during normal operation and during operation involving biting calculated for zone 3. FIG. 14 is a graph showing the correlation coefficient for zone 3 calculated using the measurement results shown in FIG. 8. FIG. 14 shows the range of errors for the entire samples using bars. Each bar represents the error range of 6σ (six standard deviations).

As show in FIG. 14, a sufficiently significant difference is observed between the normal operation and the operation involving biting, particularly in the latter portion with relatively small deviations (the area circled with a solid line in the figure). In other words, the presence of an abnormality can be detected particularly in the subsequent sealing process by sequentially calculating the correlation coefficient for the speed deviation.

As described above, the correlation coefficient for the speed deviation indicates the degree of deviation between the command value (speed command) and the feedback value (measured value). With no foreign object being bitten, the rotors 10 and 20 rotate without being disturbed. In this case, the feedback value will follow the command value. The calculated correlation coefficient will be a relatively high value. With a foreign object being bitten, the rotors 10 and 20 are disturbed while rotating. In this case, the feedback value will follow the command value by a lesser degree. The calculated correlation coefficient will have a relatively low value.

As described above, the control apparatus 100 according to the present embodiment determines the presence of an abnormality in zone 3 based on the correlation coefficient for the speed deviation in this zone. The determination criterion (typically a threshold) for the correlation coefficient for the speed deviation shown in FIG. 9 may be set based on several measurement results obtained through actual measurements during normal operation.

The presence of an abnormality in zone 3 may be determined using (a) a minimum value of a speed deviation (in the zone), (b) a maximum value of a measured torque value (in the zone), or (c) an integral of a measured torque value (in the zone), in addition to or in place of the above correlation coefficient for the speed deviation. These characteristic values are described in detail for zone 1 above, and thus will not be described.

(4) Identifying Zone Including Abnormality

As described above, the control apparatus 100 according to the present embodiment determines the presence of an abnormality for each zone using characteristic values unique to each zone. The determination result for each zone may be used to identify the zone including an abnormality. More specifically, the control apparatus 100 may determine the presence of an abnormality using a combination of determination as to whether the characteristic value calculated using the status values of the servo drivers 19 and 29 corresponding to the range in which the heaters 15 and 25 (or the heaters 16 and 26) are in contact with the packaging material 4 satisfies a first determination criterion, and determination as to whether the characteristic value calculated using the status values of the servo drivers 19 and 29 corresponding to the range in which the cutters 17 and 27 are in contact with the packaging material 4 satisfies a second determination criterion.

In one example, the result indicating that an abnormality is detected in zone 1 but no abnormality is detected in zones 2 and 3 reveals that a preceding individual package 6 has a foreign object bitten in its sealed portion but a following individual package 6 has a correctly processed sealed portion. In this case, the preceding individual package 6 can be rejected as a defect in a subsequent process.

In another example, the result indicating that an abnormality is detected in zone 3 but no abnormality is detected in zones 1 and 2 reveals that a preceding individual package 6 has a correctly processed sealed portion but a following individual package 6 has a foreign object bitten in its sealed portion. In this case, the following individual package 6 can be rejected as a defect in a subsequent process.

F. Procedure

Figure 15:
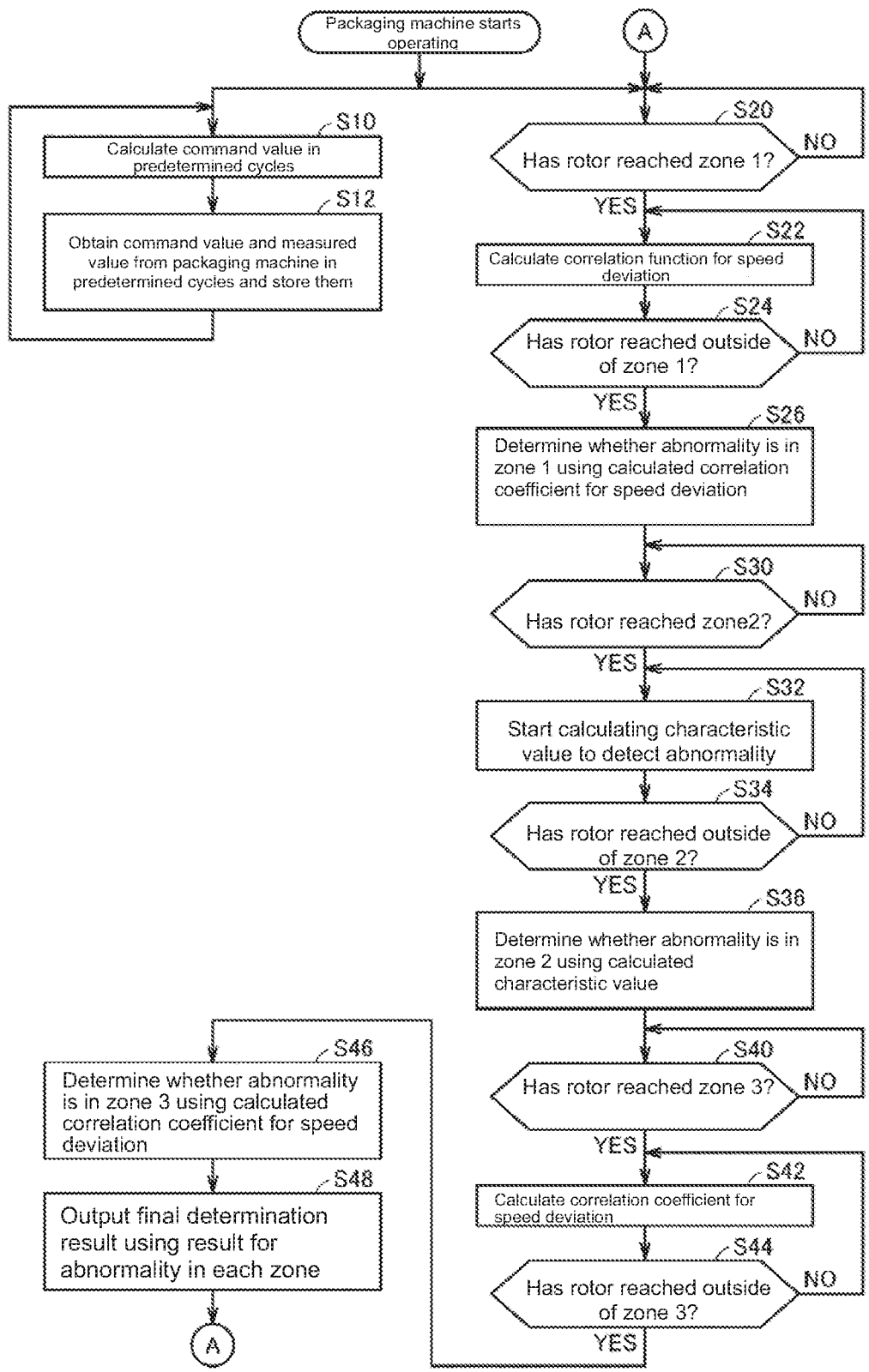
FIG. 15 is a flowchart showing a procedure implemented by the control apparatus according to the embodiment.

A procedure implemented by the control apparatus 100 according to the present embodiment will now be described. FIG. 15 is a flowchart showing the procedure implemented by the control apparatus 100 according to the present embodiment. The steps shown in FIG. 15 are typically implemented by the processor 102 included in the control apparatus 100 executing a system program 110 and a user program 112 (FIG. 3). All or some of the steps may be implemented by another device. For example, all or some of the steps may be implemented by a hardware circuit, such as an application specific integrated circuit (ASIC) or a field-programmable gate array (FPGA).

Referring now to FIG. 15, when an instruction is provided to drive the packaging machine 2, the control apparatus 100 calculates a command value, which is to be provided to the servo drivers 19 and 29 to drive and rotate the servo motors 18 and 28, in predetermined cycles (step S10). This command value may be generated by the motion program 112B included in the user program 112. Typically, the packaging material 4 is transported at a constant speed. The length of each individual package 6 is adjusted using a patterned rotational speed of the rotors 10 and 20. More specifically, the rotational speed of the rotors 10 and 20 is expressed as a multi-dimensional function of the rotational position (phase and rotational angle).

The control apparatus 100 obtains measured values from the packaging machine 2 in predetermined cycles, and stores the measured values together with the generated command value (step S12). The measured values obtained from the packaging machine 2 include the rotational positions of the rotors 10 and 20 and the status values of the servo drivers 19 and 29.

In parallel with the processing in steps S10 and S12, the control apparatus 100 determines whether the rotors 10 and 20 have reached zone 1 based on the rotational positions of the rotors 10 and 20 (step S20). When the rotors 10 and 20 have yet to reach zone 1 (No in step S20), the processing in step S20 is repeated. When the rotors 10 and 20 have reached zone 1 (Yes in step S20), the control apparatus 100 calculates a difference (speed deviation) between the obtained command value and the obtained measured speed value, and calculates the correlation coefficient for the speed deviation (step S22).

The control apparatus 100 determines whether the rotors 10 and 20 have reached the outside of zone 1 (step S24). When the rotors 10 and 20 have yet to reach the outside of zone 1 (No in step S24), the processing in step S22 is repeated.

When the rotors 10 and 20 have reached the outside of zone 1 (Yes in step S24), the control apparatus 100 determines whether an abnormality has occurred in zone 1 based on the correlation coefficient for the speed deviation calculated in step S22 (step S26).

Subsequently, the control apparatus 100 determines whether the rotors 10 and 20 have reached zone 2 based on the rotational positions of the rotors 10 and 20 (step S30). When the rotors 10 and 20 have yet to reach zone 2 (No in step S30), the processing in step S30 is repeated. When the rotors 10 and 20 have reached zone 2 (Yes in step S30), the control apparatus 100 starts calculating characteristic values that are used to determine the presence of an abnormality in zone 2 (step S32). As described above, the characteristic values for detecting an abnormality in zone 2 include at least one of the maximum value of the speed deviation after the cutting process, the minimum value of the measured torque value after the cutting process, the rotational position at which the measured speed value is at the maximum, and the rotational position at which the measured torque value is at the maximum.

The control apparatus 100 determines whether the rotors 10 and 20 have reached the outside of zone 2 (step S34). When the rotors 10 and 20 have yet to reach the outside of zone 2 (No in step S34), the processing in step S32 is repeated.

When the rotors 10 and 20 have reached the outside of zone 2 (Yes in step S34), the control apparatus 100 determines the presence of an abnormality in zone 2 based on the characteristic values calculated in step S32 (step S36).

Subsequently, the control apparatus 100 determines whether the rotors 10 and 20 have reached zone 3 based on the rotational positions of the rotors 10 and 20 (step S40). When the rotors 10 and 20 have yet to reach zone 3 (No in step S40), the processing in step S40 is repeated. When the rotors 10 and 20 have reached zone 3 (Yes in step S40), the control apparatus 100 calculates a difference (speed deviation) between the obtained command value and the obtained measured speed value, and calculates the correlation coefficient for the speed deviation (step S42).

The control apparatus 100 determines whether the rotors 10 and 20 have reached the outside of zone 3 (step S44). When the rotors 10 and 20 have yet to reach the outside of zone 3 (No in step S44), the processing in step S42 is repeated.

When the rotors 10 and 20 have reached the outside of zone 3 (Yes in step S44), the control apparatus 100 determines the presence of an abnormality in zone 3 based on the correlation coefficient for the speed deviation calculated in step S42 (step S46).

The control apparatus 100 then outputs a final determination result based on the presence or absence of an abnormality determined for each zone (step S48).

The processing in steps S10 and S12 and S20 to S48 is repeated until an instruction is provided to stop the packaging machine 2.

G. Program Library and User Program

A process for detecting biting of a foreign object performed by the control apparatus 100 according to the present embodiment will now be described. In one embodiment, the control apparatus 100 prestores the program library 110A suited to a process for detecting biting of a foreign object. A developer at a manufacturer or a vendor of the packaging machine 2 may generate, using the support apparatus 200 for example, code (a ladder program) for invoking the program library 110A as needed. The code is generated as the user program 112 for controlling the packaging machine 2. The program library 110A with the capabilities described later is provided in advance A by a manufacturer of the control apparatus 100 or a third party. The program library 110A allows the user program 112 including the process for detecting biting of a foreign object to be generated in a shorter period of time. More specifically, the program library 110A is used to execute programs in the control apparatus 100 for controlling the servo drivers 19 and 29 that drive and rotate the rotors 10 and 20.

Figure 16:
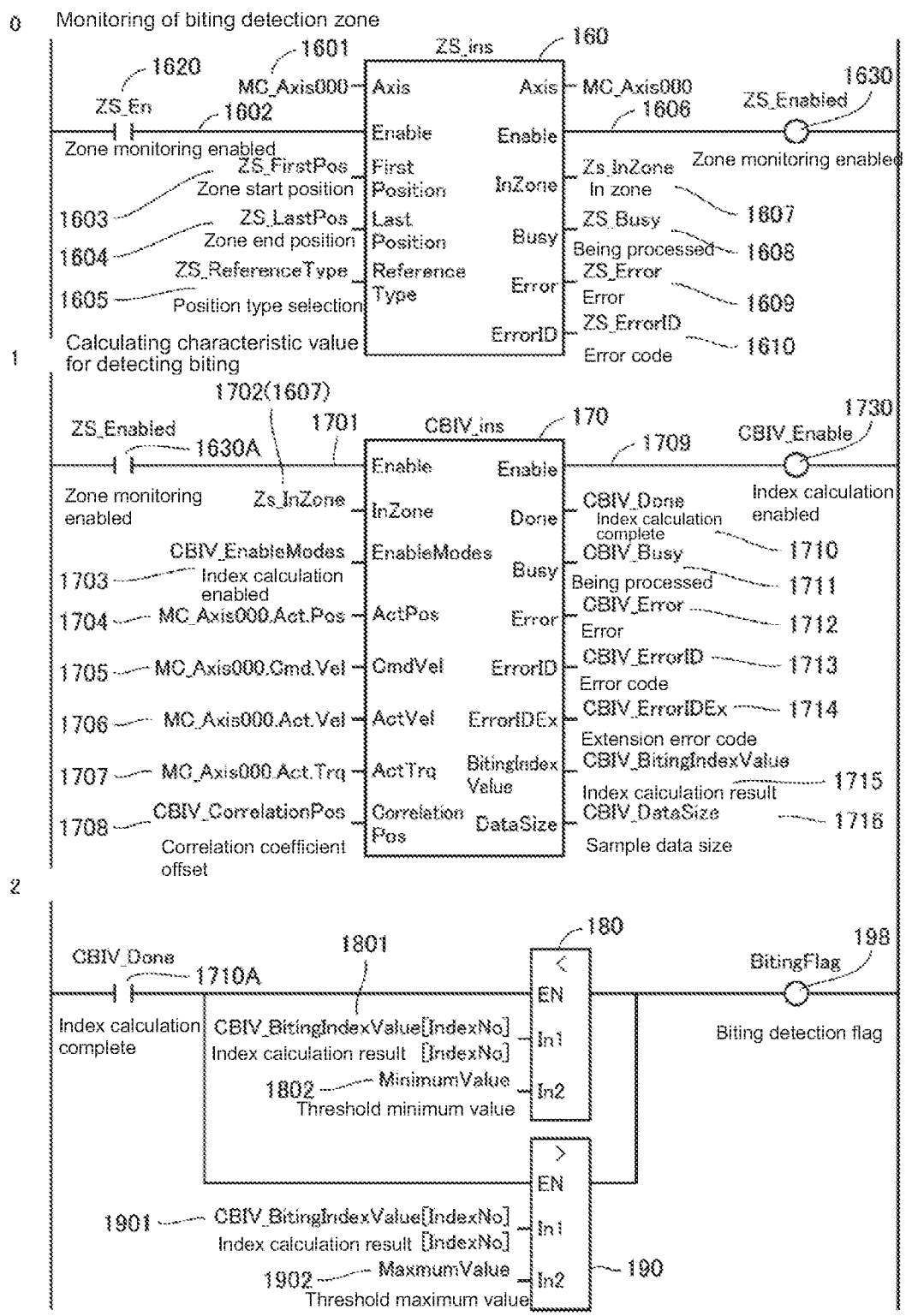
FIG. 16 is a diagram showing a user program that is executed by the control apparatus according to the embodiment.

FIG. 16 is an example of the user program 112 that is executed by the control apparatus 100 according to the present embodiment. FIG. 16 shows a part of the procedure associated with detection of foreign object biting. As shown in FIG. 16, the user program 112 is defined as a ladder logic program. The user program 112 mainly includes a zone detection functional block 160, a characteristic value calculation functional block 170, and threshold determination functional blocks 180 and 190. All or some of these functional blocks include instructions, each of which calls the corresponding program library 110A (or the corresponding code of the program library 110A) when its execution timing comes. In other words, the program libraries 110A, which are sources for programs enabling the functional blocks, are provided in advance. The processor 102 (FIG. 3) invokes and implements each program library 110A as needed in accordance with programs. The capabilities of the functional blocks will now be described g1: Zone Detection Functional Block The zone detection functional block 160 detects a zone for which the presence of an abnormality in a sealed portion of the packaging material 4 is to be determined based on the rotational position of the rotor 10. When the rotational position of the rotor 10 is within a predetermined range, an in-zone signal (ZS_InZone) 1607 is set to TRUE. More specifically, the zone detection functional block 160 has the rotational position of the rotor 10 (MC_Axis000) 1601, the start position of the zone (ZS_FirstPos) 1603, and the end position of the zone (ZS_LastPos) 1604 as its input signals. The rotational position of the rotor 10 (MC_Axis000) 1601 reflects information from the servo driver 19 (or an encoder attached to the rotational shaft of the rotor 10) that is obtained in predetermined sampling cycles. The zone start position (ZS_FirstPos) 1603 and the zone end position (ZS_LastPos) 1604 are expressed using preset constants or variables. These values each define the range of a zone for which the presence of an abnormality is to be determined. When the rotational position of the rotor 10 (MC_Axis000) 1601 is within the range from the zone start position (ZS_FirstPos) 1603 to the zone end position (ZS_LastPos) 1604, the in-zone signal (ZS_InZone) 1607 changes to TRUE. When the rotational position is not within this range, the in-zone signal (ZS_InZone) 1607 is maintained as FALSE. In other words, the in-zone signal (ZS_InZone) 1607 is set to TRUE only when the rotational position of the rotor 10 falls within a predetermined range or is a predetermined position.

The zone detection functional block 160 further has an enabling signal 1602 and a position type selection signal (ZS_ReferenceType) 1605 as its input signals. The enabling signal 1602 includes a zone monitoring enabling signal (ZS_1620. While the zone monitoring enabling signal (ZS_En) 1620 is TRUE, the zone detection functional block 160 repeatedly performs determination for detecting a zone. The position type selection signal (ZS_ReferenceType) 1605 selects the type of the rotational position of the rotor 10 (MC_Axis000) 1601.

The zone detection functional block 160 has an enabling signal 1606, a busy signal (ZS_Busy), an error signal (ZS_Error) 1609, and an error code (ZS_ErrorID) 1610 as its output signals. The enabling signal 1606 has the value of the enabling signal 1602 as its output value. A zone monitoring enabling signal (ZS_Enable) 1630 is connected to the enabling signal 1606. The zone monitoring enabling signal (ZS_Enable) 1630 has the same value as the zone monitoring enabling signal (ZS_En) 1620. The busy signal (ZS_Busy) 1608 is set to TRUE while the signal is being processed in the zone detection functional block 160. In the case of any computational error, the error signal (ZS_Error) 1609 has its output value indicating that an error has occurred, and the error code (ZS_ErrorID) 1610 has its output value indicating the details about the error.

g2: Characteristic Value Calculation Functional Block

The characteristic value calculation functional block 170 mainly enables data sampling and index calculation. The data sampling includes obtaining the status value of the servo driver 19 in predetermined cycles. The index calculation includes calculating one or more characteristic values based on the status value of the servo driver 19. The characteristic values are used to detect an abnormality in each zone. In particular, the characteristic value calculation functional block 170 can selectively calculate characteristic values from a plurality of characteristic values available. With such selective capabilities, a user program can be generated to calculate selected characteristic values as needed in accordance with an abnormality to be detected and/or a zone in which an abnormality is to be detected, and to perform necessary determination.

More specifically, the characteristic value calculation functional block 170 has a rotational position of the rotor 10 (MC_Axis000.Act.Pos) 1704, a speed command (command value) (MC_Axis000.Cmd.Vel) 1705 provided to the servo driver 19, a measured speed value (feedback value) (MC_Axis000.Act.Vel) 1706 of the servo driver 19, and a measured torque value (MC_Axis000.Act.Trq) 1707 generated in the rotor 10 as its input signals. These values reflect information from the servo driver 19 (or an encoder attached to the rotational shaft of the rotor 10) that is obtained in predetermined sampling cycles. The values are selectively obtained as needed for a specified characteristic value. The characteristic value calculation functional block 170 has a correlation coefficient offset (CBIV_CorrelationPos) 1708 as its input signal. The initial value of the correlation coefficient for the speed deviation written using Formula (1) above is input as the correlation coefficient offset (CBIV_CorrelationPos) 1708.

The characteristic value calculation functional block 170 further has an in-zone signal (ZS_InZone) 1702 as its input signal. This in-zone signal (ZS_InZone) 1702 reflects the same value as the value of the in-zone signal (ZS_InZone) 1607, which is output from the zone detection functional block 160. The characteristic value calculation functional block 170 starts obtaining the status value of the servo driver 19 and calculating one or more characteristic values in response to the rising edge of the in-zone signal (ZS_InZone) 1702, and stops obtaining and calculating the values in response to the falling edge of the zone signal. More specifically, the in-zone signal (ZS_InZone) 1702 (or 1607) corresponds to input information indicating that the rotational position of the rotor 10 is within a predetermined range or is a predetermined position.

The characteristic value calculation functional block 170 further has an index calculation enabling signal (CBIV_EnableModes) 1703 as its input signal. The index calculation enabling signal (CBIV_EnableModes) 1703 is typically a Boolean array signal, which specifies one or a plurality of predetermined characteristic values to be calculated selectively from the plurality of characteristic values available. When ten characteristic values are available for calculation, for example, the index calculation enabling signal (CBIV_EnableModes) 1703 is defined to have an array of ten elements. To enable calculation of the first and second characteristic values selectively from the set of ten characteristic values, the values of the first and second elements are set to TRUE, and the values of the remaining elements are set to FALSE. More specifically, the index calculation enabling signal (CBIV_EnableModes) 1703 corresponds to input information for specifying one or more characteristic values to be calculated selectively from the plurality of characteristic value candidates available.

The characteristic value calculation functional block 170 further has an enabling signal 1701 as its input signal. The enabling signal 1701 includes an input zone monitoring enabling signal (ZS_Enable) 1630A. While the zone monitoring enabling signal (ZS_Enable) 1630A is TRUE, the characteristic value calculation functional block 170 is enabled to calculate characteristic values.

The characteristic value calculation functional block 170 has an index calculation result (CBIV_BitingIndexValue) 1715 and a sample data number (CBIV_DataSize) 1716 as its output signals.

The index calculation result 1715 is an output of one or more characteristic values specified by the index calculation enabling signal (CBIV_EnableModes) 1703.

The index calculation result 1715 is typically a stored structure variable. Each of the characteristic values that are output as the index calculation result 1715 is calculated using the status value of the servo driver 19 (and the rotational position of the rotor 10) obtained between the rising timing of the in-zone signal (ZS_InZone) 1702 to the falling timing of the signal. More specifically, the characteristic value calculation functional block 170 enables calculation of one or more characteristic values specified by the index calculation enabling signal (CBIV_EnableModes) 1703 (second input information) corresponding to the rotational position of the rotor 10 indicated by the index calculation enabling signal (CBIV_EnableModes) 1703 (first input information) falling within a predetermined range or being a predetermined position based on the status value of the servo driver 19 obtained in predetermined cycles.

The sample data number 1716 is a variable indicating the number of pieces of data used to calculate the index calculation result 1715. The value of the sample data number 1716 is updated as needed during calculation of the index (characteristic value).

The characteristic value calculation functional block 170 further has an enabling signal 1709, an index calculation completion signal (CBIV_Done) 1710, a busy signal (CBIV_Busy) 1711, an error signal (CBIV_Error) 1712, an error code (CBIV_ErrorID) 1713, and an extension error code (CBIV_ErrorIDEx) 1714 as its output signals.

The enabling signal 1709 has the value of the enabling signal 1701 as its output value. An index calculation enabling signal (CBIV_Enable) 1730 is connected to the enabling signal 1709. The index calculation enabling signal (CBIV_Enable) 1730 has the same value as the enabling signal 1709.

The index calculation completion signal (CBIV_Done) 1710 is set to TRUE when the calculation of characteristic values for a predetermined period of time is complete. The busy signal (CBIV_Busy) 1711 is set to TRUE during the calculation of characteristic values for the predetermined period. The error signal (CBIV_Error) 1712, the error code (CBIV_ErrorID) 1713, and the extension error code (CBIV_ErrorIDEx) 1714 have their output values indicating whether an abnormality has occurred and indicating the details about the abnormality.

g3: Threshold Determination Functional Block

The threshold determination functional blocks 180 and 190 determine whether the calculated characteristic value satisfies a preset criterion for determination. More specifically, the threshold determination functional blocks 180 and 190 compare the calculated characteristic value with a preset threshold. When determining that either the value exceeds the threshold or the value is below the threshold, the threshold determination functional blocks 180 and 190 change the value of a biting detection flag (BitingFlag) 198 to TRUE.

The threshold determination functional block 180 outputs TRUE when the first input value is below the second input value. The threshold determination functional block 180 has its first input receiving an index calculation result (CBIV_BitingIndexValue[IndexNo]) 1801, which is identified using an index number IndexN, and has its second input receiving a minimum value of a predetermined threshold (MinimumValue) 1802. More specifically, when the index calculation result (CBIV_BitingIndexValue[IndexNo]) 1801 identified using the index number IndexNo is below the minimum threshold value (MinimumValue) 1802, the biting detection flag (BitingFlag) 198 changes to TRUE.

The threshold determination functional block 190 outputs TRUE when its first input value exceeds the second input value. The threshold determination functional block 190 has its first input receiving an index calculation result (CBIV_BitingIndexValue[IndexNo]) 1901 identified using an index number IndexNo, and has its second input receiving a predetermined maximum threshold value (MaximumValue) 1902. More specifically, when the index calculation result (CBIV_BitingIndexValue[IndexNo]) 1901 identified using the index number IndexNo exceeds the maximum threshold value (MaximumValue) 1902, the biting detection flag (BitingFlag) 198 is set to TRUE.

The threshold determination functional blocks 180 and 190 are enabled to perform the determination described above while the index calculation completion signal (CBIV_Done) 1710A is TRUE.

Although the threshold determination functional blocks 180 and 190 in the structure shown in FIG. 16 determine whether the single characteristic value is within the predetermined threshold range, the functional blocks may determine whether a plurality of characteristic values satisfy their respective determination criteria. In this case, the structure may include a plurality of threshold determination functional blocks defined respectively for the plurality of characteristic values.

g4: Timing Chart

FIG. 17 is a timing chart during execution of the user program 112 shown in FIG. 16. Referring now to FIG. 17, (a) when the in-zone signal (ZS_InZone) rises (changes from FALSE to TRUE) at time T1, (b) the busy signal (ZS_Busy) changes to TRUE to start the process of obtaining the status value of the servo driver 19 in predetermined cycles and calculating one or more identified indexes (characteristic values). In parallel with this, (e) the value of the sample data number (CBIV_DataSize) is incremented accordingly when the data is obtained.

Subsequently, (a) when the in-zone signal (ZS_InZone) falls at time T2 (changes from TRUE to FALSE), (b) the busy signal (ZS_Busy) changes to FALSE to end the process of obtaining the status value of the servo driver 19 and calculating the indexes (characteristic values). Subsequently, (d) the index calculation result (CBIV_BitingIndexValue) is output (updated). In parallel with this, (c) the index calculation completion signal (CBIV_Done) changes to TRUE to notify the update of the index calculation result.

g5: Index Calculation Result Candidate

As described above, the characteristic value calculation functional block 170 is designed to calculate a plurality of indexes (characteristic values). The calculation process is enabled for one or more indexes (characteristic values) specified by the index calculation enabling signal (CBIV_EnableModes), selectively from the plurality of indexes (characteristic value candidates).

Table 1 below shows the correspondence between the indexes (characteristic value candidates) and the index calculation enabling signals (CBIV_EnableModes) CBIV_EnableModes [0] to CBIV_EnableModes [8].

TABLE 1

| Index calculation enabling signal | Index calculation result | Details about index (characteristic value) |
|---|---|---|
| CBIV_EnableModes [0] | CBIV_BitingIndexValue [0] | Minimum of difference (speed deviation) between speed command to servo driver and measured speed value of rotor |
| CBIV_EnableModes [1] | CBIV_BitingIndexValue [1] | Maximum of difference (speed deviation) between speed command to servo driver and measured speed value of rotor |
| CBIV_EnableModes [2] | CBIV_BitingIndexValue [2] | Difference between maximum and minimum of difference between speed command and measured speed value of rotor |
| CBIV_EnableModes [3] | CBIV_BitingIndexValue [3] | Minimum of measured torque value |
| CBIV_EnableModes [4] | CBIV_BitingIndexValue [4] | Maximum of measured torque value |
| CBIV_EnableModes [5] | CBIV_BitingIndexValue [5] | Integral of measured torque value |
| CBIV_EnableModes [6] | CBIV_BitingIndexValue [6] | Rotational position (phase and rotational angle) at which difference (speed deviation) between speed command to servo driver and measured speed value of rotor is at maximum |

TABLE 1-continued

| Index calculation enabling signal | Index calculation result | Details about index (characteristic value) |
|---|---|---|
| CBIV_EnableModes [7] | CBIV_BitingIndexValue [7] | Rotational position (phase and rotational angle) at which measured torque value is at maximum |
| CBIV_EnableModes [8] | CBIV_BitingIndexValue [8] | Correlation coefficient for difference (speed deviation) between speed command to servo driver and measured speed value of rotor |

For example, when CBIV_EnableModes=(0, 1, 0, 1, 0, 0, 1, 1, 1), the calculation is enabled for the elements with array numbers [1], [3], [6], [7], [8].

The indexes (characteristic values) described above may all be prepared in advance as candidates for calculation. As described above, at least some of the indexes (characteristic value) enclosed in the above table may be prepared to determine the presence of an abnormality in each zone. More specifically, the characteristic value calculation functional block 170 may prepare the plurality of characteristic value candidates in advance including at least some of (a plurality of) the indexes (characteristic values) listed below.

(1) The maximum value of the difference (speed deviation) between the value of the speed command provided to the servo driver 19 and the measured speed value of the rotor 10

(3) The minimum value of the measured torque value generated in the rotor 10

(6) The rotational position (phase and rotational angle) of the rotor 10 at which the difference (speed deviation) between the value of the speed command provided to the servo driver 19 and the measured speed value of the rotor 10 is at the maximum (7) The rotational position of the rotor 10 (phase and rotational angle) at which the measured torque value generated in the rotor 10 is at the maximum (8) The correlation coefficient for the difference between the value of the speed command provided to the servo driver 19 and the measured speed value of the rotor 10 g6: Other Embodiments

Although the program library 110A in the structure shown in FIG. 3 is a dynamic-link library, which is liked dynamically with and used by the user program 112, the program library 110A may be implemented as a symbolic link library, which is linked statically with the user program 112. The program library as a symbolic link library is typically implemented using source code. The source code is directly incorporated into the user program 112, or object code to which the source code is converted is incorporated into the user program 112. In this case, the program library may be in the control apparatus 100, or may be in the support apparatus 200, or in both the control apparatus and the support apparatus.

The program library should not be limited by its name. Its technical significance should be interpreted from the terms included in the claims. For example, the program library may also be referred to as a subroutine program or simply a library, which are all covered by the program library according to one or more embodiments of the present invention.

g7: Advantages

The characteristic value calculation functional block 170 described above and the program library 110A for implementing the characteristic value calculation functional block 170 enable a user program to be generated more easily without many man-hours. In particular, one or more of the indexes (characteristic values) are selected and calculated as needed to determine the presence of an abnormality. This allows a user program to be generated in a flexible manner.

Although the calculated indexes (characteristic values) are obtained based on knowledge acquired by the inventors, users without knowledge equivalent to knowledge of the inventors would easily implement the capabilities of detecting an abnormality with higher accuracy according to one or more embodiments.

H. Conclusions

The control apparatus 100 according to the present embodiment determines the presence of an abnormality (typically biting of a foreign object or a sealing defect) in a sealed portion of the packaging material 4 based on the status values of the servo drivers 19 and 29 (typically one or more characteristic values calculated for each zone described above) corresponding to the rotational position of the rotors 10 and 20 falling within a predetermined range or being a predetermined position. More specifically, the use of the characteristic values for each zone that are responsive to the presence of an abnormality enables highly accurate determination about biting of a foreign object or evaluation of the sealing achieved by the packaging machine.

The support apparatus 200 according to the present embodiment enables a developer with less knowledge to easily implement the user program for detecting biting of a foreign object or a sealing defect in the packaging machine with higher accuracy.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST

1 system
2 packaging machine
4 packaging material
5 packaging target
6 individual package
8 conveyor belt
10 rotor
12 rotational shaft
14, 24 processing mechanism
15, 16, 25, 26 heater
17, 27 cutter
18, 28 servo motor
19, 29 servo driver
100 control apparatus
102 processor 104 chip set
106 main memory
108 flash memory
110 system program
112 user program
112A sequence program
112B motion program
116 external network controller
118 memory card interface
120 memory card
122 internal bus controller
124 field bus controller
126, 128 I/O unit
130 field bus
150 data obtaining module
152 buffer
54 determination module
156 output module
160 zone detection functional block
170 characteristic value calculation functional block
180, 190 threshold determination functional block
200 support apparatus

The invention claimed is:

1. A method that allows a control apparatus to control a driver, the driver being configured to drive and rotate a rotor, the method comprising:

receiving first input information indicating that a rotational position of the rotor falls within a predetermined range or is a predetermined position, and second input information identifying one or more characteristic values to be calculated selectively from a plurality of characteristic value candidates, the one or more characteristic values for determining the presence of an abnormality based on meeting a predetermined determination criteria; and calculating the one or more characteristic values specified by the second input information corresponding to the rotational position of the rotor indicated by the first input information falling within the predetermined range or being the predetermined position using a status value of the driver obtained in predetermined cycles to determine whether the one or more characteristic values meet the predetermined determination criteria, wherein the plurality of characteristic value candidates comprise at least two of:

a maximum value of a difference between a value of a speed command provided to the driver and a measured speed value of the rotor;

a minimum value of a measured torque value generated in the rotor;

a rotational position of the rotor at which a difference between a value of a speed command provided to the driver and a measured speed value of the rotor is at a maximum;

a rotational position of the rotor at which the measured torque value generated in the rotor is at a maximum; and a correlation coefficient for a difference between the value of the speed command provided to the driver and the measured speed value of the rotor.

2. A control apparatus for controlling a driver configured to drive and rotate a rotor, the control apparatus comprising a processor configured with a program to perform operations to control the driver, comprising executing the method according to claim 1.

* * * * *